United States Patent
Zheng et al.

(10) Patent No.: US 11,030,641 B2
(45) Date of Patent: Jun. 8, 2021

(54) METHOD AND SYSTEM FOR ONLINE ADVERTISING

(75) Inventors: Zhaohui Zheng, Beijing (CN); Xin Li, Beijing (CN); Rongqing Lu, Beijing (CN)

(73) Assignee: BEIJING YIDIAN WANGJU TECHNOLOGY CO., LTD., Beijing (CN)

( * ) Notice: Subject to any disclaimer, the term of this patent is extended or adjusted under 35 U.S.C. 154(b) by 920 days.

(21) Appl. No.: 14/404,367

(22) PCT Filed: Jun. 29, 2012

(86) PCT No.: PCT/CN2012/077825
§ 371 (c)(1),
(2), (4) Date: Nov. 26, 2014

(87) PCT Pub. No.: WO2014/000243
PCT Pub. Date: Jan. 3, 2014

(65) Prior Publication Data
US 2015/0142555 A1    May 21, 2015

(51) Int. Cl.
*G06Q 30/02* (2012.01)
*H04L 29/08* (2006.01)
(Continued)

(52) U.S. Cl.
CPC ..... *G06Q 30/0242* (2013.01); *G06Q 30/0241* (2013.01); *G06Q 30/0244* (2013.01);
(Continued)

(58) Field of Classification Search
CPC ............ G06Q 30/02; G06Q 30/0242; G06Q 30/0241; G06Q 30/0244; G06Q 30/0251;
(Continued)

(56) References Cited

U.S. PATENT DOCUMENTS 7,050,990 B1    5/2006    Chu et al.
8,306,922 B1 *  11/2012   Kunal ................... G06Q 50/01
                                                    705/319
(Continued)

FOREIGN PATENT DOCUMENTS

CN    1374598 A    10/2001
CN    1336610 A    2/2002
(Continued)

OTHER PUBLICATIONS

International Search Report dated Apr. 4, 2013 in International Application PCT/CN2012/077825.
(Continued)

*Primary Examiner* — Thuy N Nguyen
(74) *Attorney, Agent, or Firm* — Gang Yu

(57) ABSTRACT

Method, system, and programs for online advertising are disclosed. One or more targets associated with an entity are identified based on a first piece of information related to each target and a second piece of information related to the entity. The one or more targets are considered as likely being interested in content that can be made available by the entity. A connection is established between the entity and each identified target through a bi-directional communication channel. Activities between the entity and each target through the bi-directional communication channel are monitored. The entity delivers the content to an identified target through the bi-directional communication channel established between the entity and the identified target. In response to the delivered content, the identified target is able to provide a feedback to the entity through the bi-directional communication channel.

40 Claims, 18 Drawing Sheets

(51) Int. Cl.
*G06Q 50/00* (2012.01)
*H04L 12/14* (2006.01)

(52) U.S. Cl.
CPC ..... *G06Q 30/0247* (2013.01); *G06Q 30/0251* (2013.01); *G06Q 30/0269* (2013.01); *G06Q 30/0277* (2013.01); *G06Q 50/01* (2013.01); *H04L 67/20* (2013.01); *H04L 12/1492* (2013.01)

(58) Field of Classification Search
CPC ........... G06Q 30/0269; G06Q 30/0277; G06Q 30/0247; G06Q 50/01; H04L 12/1492; H04L 67/20
See application file for complete search history.

(56) References Cited

U.S. PATENT DOCUMENTS

| | | | |
|---|---|---|---|
| 8,924,465 B1* | 12/2014 | Tunguz-Zawislak | ......................... H04N 21/00 709/203 |
| 9,105,032 B2* | 8/2015 | Altberg | .................. G06Q 30/02 |
| 2004/0236669 A1* | 11/2004 | Horst | ..................... G06Q 40/04 705/37 |
| 2006/0020596 A1* | 1/2006 | Liu | ................... G06F 17/30867 |
| 2007/0198510 A1* | 8/2007 | Ebanks | ................. G06Q 30/02 |
| 2009/0234825 A1 | 9/2009 | Xia et al. | |
| 2009/0265245 A1* | 10/2009 | Wright | .................. G06Q 30/02 705/14.66 |
| 2010/0049538 A1* | 2/2010 | Frazer | ................... G06Q 30/02 705/14.4 |
| 2011/0010366 A1* | 1/2011 | Varshavsky | ....... G06F 17/30864 707/732 |
| 2011/0033050 A1* | 2/2011 | Maller | .................. G06Q 30/02 380/259 |
| 2011/0167071 A1* | 7/2011 | Yang | ..................... G06Q 30/02 707/741 |
| 2011/0270748 A1* | 11/2011 | Graham, III | ........... G06Q 40/00 705/40 |
| 2012/0166530 A1* | 6/2012 | Tseng | .................. G06Q 30/0255 709/204 |
| 2012/0271860 A1* | 10/2012 | Graham, Jr. | ............ G06F 16/48 707/798 |
| 2013/0085840 A1* | 4/2013 | Andre | ................ G06Q 30/0272 705/14.45 |
| 2013/0166379 A1* | 6/2013 | Ehindero | ................ G06Q 30/02 705/14.52 |
| 2014/0040786 A1* | 2/2014 | Swanson | ................ G06F 3/0484 715/760 |
| 2015/0106178 A1* | 4/2015 | Atazky | .................... H04L 51/32 705/14.16 |
| 2015/0310484 A1* | 10/2015 | Haile | ................. G06Q 30/0246 705/14.45 |

FOREIGN PATENT DOCUMENTS

| | | |
|---|---|---|
| CN | 1545273 A | 11/2004 |
| CN | 1640133 A | 7/2005 |
| CN | 1898664 A | 1/2007 |
| CN | 102077182 A | 5/2011 |

OTHER PUBLICATIONS

First Office Action as issued in Chinese Patent Application No. 201280074266.X, dated Feb. 13, 2017.

Wang, Wen-ning, et al., "A Fast Matching Algorithm Based on Vector Correlation," Laser & Infrared, vol. 38, No. 11, Nov. 2008, pp. 1164-1167.

Office Action dated Feb. 2, 2018 issued in Chinese Application 201280074266.X.

Office Action dated Mar. 10, 2020 in Chinese Application 201811268955.X.

* cited by examiner

METHOD AND SYSTEM FOR ONLINE ADVERTISING

BACKGROUND

1. Technical Field

The present teaching relates to methods, systems, and programming for Internet services. Particularly, the present teaching relates to methods, systems, and programming for online advertising.

2. Discussion of Technical Background

Online advertising is a form of promotion that uses the Internet and World Wide Web to deliver marketing messages to attract customers. Examples of online advertising include contextual ads on search engine result pages, banner ads, blogs, rich media ads, interstitial ads, online classified advertising, advertising networks, and e-mail marketing. Many of these types of ads are delivered by an advertising serving mechanism such as an advertising server.

FIG. 1 illustrates a prior art system 100 for online advertising. The system 100 includes an advertising serving mechanism 102 for delivering advertisers' 104 advertisements stored in the advertisement archive 106 to users 108. Display advertising may appear on the users' 108 web pages in many forms, including web banners. In FIG. 1, an individualized advertising mechanism 110 may be employed in conjunction with the advertising serving mechanism 102 to provide personalized display advertising for each individual user 108 based on the user's profile and online behaviors. However, the prior art system 100 merely establishes a unidirectional communication channel from the advertisers 104 to the users 108 for delivering marketing messages. Information, such as users' feedback on the delivered messages, is not effectively provided to the advertisers 104. The prior art system 100 also lacks an effective means to identify the most-wanted audiences from all the available users 108 for each advertiser 104 in order to provide targeted advertising. Moreover, the prior art system 100 applies traditional revenue models, such as cost per impression, cost per visitor, cost per click, annual service fee, etc., which lack flexibilities, in particular, in social network settings.

Therefore, there is a need to provide an improved solution for online advertising through a bi-directional communication channel between the most-relevant entities and targets and a flexible monetization scheme in order to solve the above-mentioned problems.

SUMMARY

The present teaching relates to methods, systems, and programming for online advertising.

In one example, a method, implemented on at least one machine each of which has at least one processor, storage, and a communication platform connected to a network for online advertising, is disclosed. One or more targets associated with an entity are identified based on a first piece of information related to each target and a second piece of information related to the entity. The one or more targets are considered as likely being interested in content that can be made available by the entity. A connection is established between the entity and each identified target through a bi-directional communication channel. Activities between the entity and each target through the bi-directional communication channel are monitored. The entity delivers the content to an identified target through the bi-directional communication channel established between the entity and the identified target. In response to the delivered content, the identified target is able to provide a feedback to the entity through the bi-directional communication channel.

In another example, a method, implemented on at least one machine each of which has at least one processor, storage, and a communication platform connected to a network for online advertising, is disclosed. A first piece of information related to a user is obtained. One or more entities are identified, with respect to the user, based on the first piece of information related to the user and a second piece of information related to each entity. Each identified entity is capable of providing content, and the one or more identified entities are considered as likely having content that is of interest of the user. A connection is established between the user and each identified entity through a bi-directional communication channel. One or more pieces of content that can be made available by each identified entity are identified based on the first piece of information related to the user and the second piece of information related to each identified entity. The delivery of the identified one or more pieces of content is facilitated from each identified entity through the bi-directional communication channel established between each identified entity and the user. The identified entity delivers the identified one or more pieces of content to the user through the bi-directional communication channel therebetween. In response to the delivered one or more pieces of content, the user is able to provide a feedback to the identified entity through the bi-directional communication channel therebetween.

In still another example, a method, implemented on at least one machine each of which has at least one processor, storage, and a communication platform connected to a network for online advertising, is disclosed. One or more targets associated with an entity are identified. The one or more targets are considered as likely being interested in content that can be made available by the entity. A mechanism for observing communication between each identified target and the entity is automatically set up via a bi-directional communication channel established between the entity and each identified target. A volume of content delivered by the entity to a corresponding identified target through the bi-directional communication channel therebetween is monitored with respect to each bi-directional communication channel. A monetary amount to be charged to the entity is calculated based on the monitored volume of content delivered from the entity to each identified target.

In yet another example, a method, implemented on at least one machine each of which has at least one processor, storage, and a communication platform connected to a network for online advertising, is disclosed. One or more targets associated with an entity are identified based on an influence level of each target on a social network platform. The one or more targets are considered as likely being interested in content that can be made available by the entity. A connection between the entity and each identified target is established through a bi-directional communication channel. Activities between the entity and each identified target through the bi-directional communication channel are monitored. Information related to the monitored activities is provided to the entity to facilitate the entity to determine whether to send the content to each identified target. The entity delivers the content to an identified target through the bi-directional communication channel established between the entity and the identified target. In response to delivered content, the identified target is able to provide a feedback to the entity through the bi-directional communication channel.

In yet another example, a method, implemented on at least one machine each of which has at least one processor, storage, and a communication platform connected to a network for online advertising, is disclosed. One or more targets associated with an entity are identified based on a first piece of information related to each target and a second piece of information related to the entity. The one or more targets are considered as likely being interested in content that can be made available by the entity. The entity is recommended to the identified one or more targets to follow the entity. A connection between the entity and each identified target through a bi-directional communication channel is established on a social network platform based on a response to the recommendation. The entity delivers the content to an identified target through the bi-directional communication channel established between the entity and the identified target. In response to the delivered content, the identified target is able to provide a feedback to the entity through the bi-directional communication channel.

In yet another example, a method, implemented on at least one machine each of which has at least one processor, storage, and a communication platform connected to a network for online advertising, is disclosed. One or more targets associated with an entity are identified based on a first piece of information related to each target and a second piece of information related to the entity. The one or more targets are considered as likely being interested in content that can be made available by the entity. The entity is facilitated to send invitations to the identified one or more targets to follow the entity. A connection between the entity and each identified target through a bi-directional communication channel is established on a social network platform based on a response to the invitations. The entity delivers the content to an identified target through the bi-directional communication channel established between the entity and the identified target. In response to the delivered content, the identified target is able to provide a feedback to the entity through the bi-directional communication channel.

In a different example, a system for online advertising is disclosed. The system comprises an identifier, a connection initiator, and an online activity monitor. The identifier is configured to identify one or more targets associated with an entity based on a first piece of information related to each target and a second piece of information related to the entity. The one or more targets are considered as likely being interested in content that can be made available by the entity. The connection initiator is configured to establish a connection between the entity and each identified target through a bi-directional communication channel. The online activity monitor is configured to monitor activities between the entity and each identified target through the bi-directional communication channel. The entity delivers the content to an identified target through the bi-directional communication channel established between the entity and the identified target. In response to the delivered content, each identified target is able to provide a feedback to the entity through the bi-directional communication channel Other concepts relate to software for online advertising. A software product, in accordance with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for online advertising, wherein the information, when read by the machine, causes the machine to perform a series of steps. One or more targets associated with an entity are identified based on a first piece of information related to each target and a second piece of information related to the entity. The one or more targets are considered as likely being interested in content that can be made available by the entity. A connection is established between the entity and each identified target through a bi-directional communication channel. Activities between the entity and each target through the bi-directional communication channel are monitored. The entity delivers the content to an identified target through the bi-directional communication channel established between the entity and the identified target. In response to the delivered content, the identified target is able to provide a feedback to the entity through the bi-directional communication channel.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of online advertising. The method and system as disclosed herein is capable of building a bi-directional real-time communication channel for advertisers and their most-wanted audiences on social network platforms. The online advertising mechanism employed in the present disclosure is not only impression based, but more facilities an individualized two-way communication between the advertisers and targets to enhance advertising quality, thereby preventing massively dumping the same advertisement to the targets. Compared to the traditional display advertising with high-level metadata information, more dynamic, fine-grained and time-sensitive information about a product may be presented to the targets in a real-time manner by the method and system as disclosed herein. Furthermore, the method and system provide an individualized platform to rank advertisers/advertisements for users and to rank users for advertisers based on profiling of both the users and advertisers/advertisements. Moreover, the present disclosure provides a more flexible monetization scheme based upon information exchange through the bi-directional communication channel between the advertisers and the targets, such as the volume of information, size of the audiences, or the relationship of the connection.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

Figure 1:
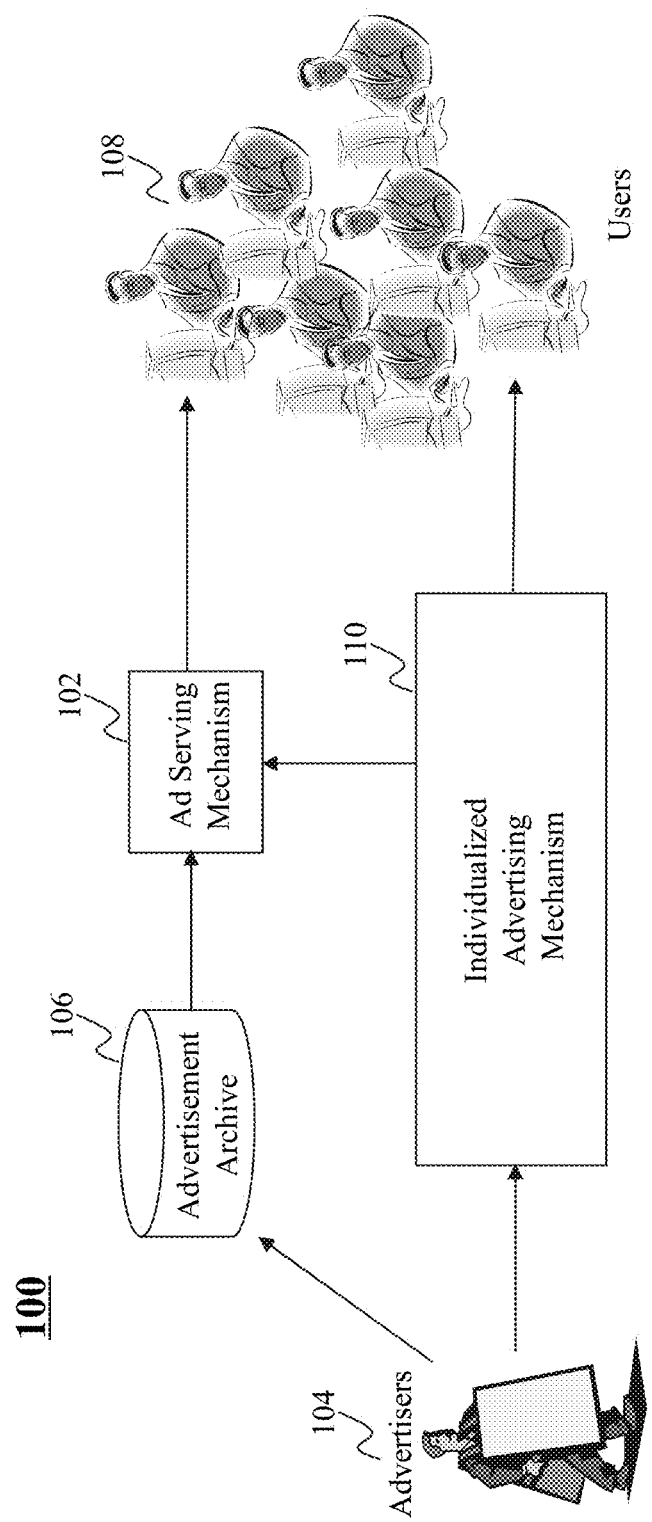
FIG. 1 depicts a prior art system for online advertising.
Figure 2:
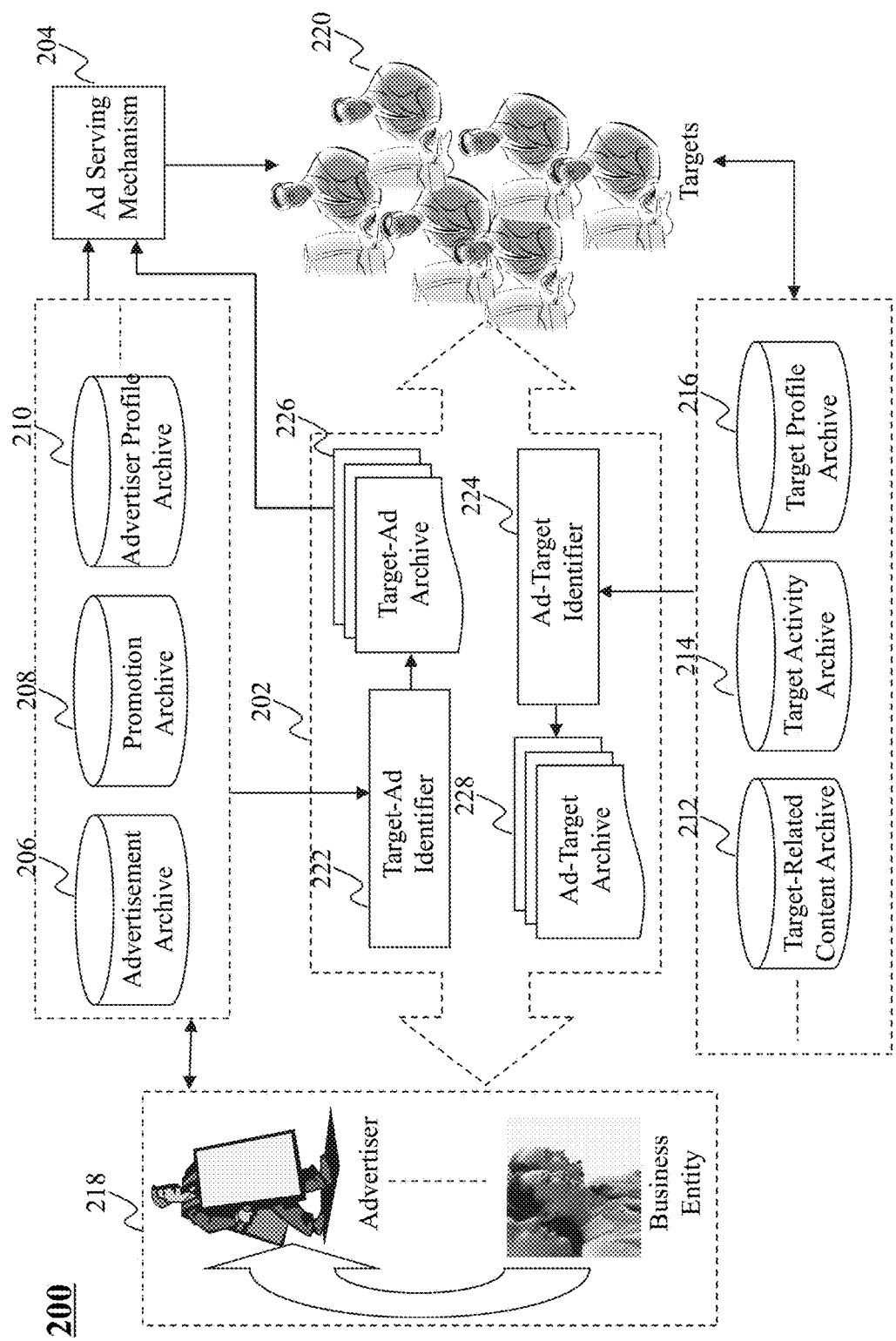
FIG. 2 is a high level exemplary system diagram of a system for online advertising, according to an embodiment of the present teaching.

FIG. 2 is a high level illustration of a system for online advertising, according to an embodiment of the present teaching. The system 200 includes a bi-directional advertising network platform 202, an advertising serving mechanism 204, a plurality of advertising-related archives 206, 208, 210, and a plurality user-related archives 212, 214, 216. In this example, the bi-directional advertising network platform 202 serves as a bi-directional communication channel between entities 218, e.g., business entities or advertisers, and targets 220. The targets 220 in this example are users who are identified, by the bi-directional advertising network platform 202, as the wanted audience of the entities 218.

The bi-directional advertising network platform 202 may include a target-ad identifier 222, an ad-target identifier 224, a target-ad archive 226, and an ad-target archive 228. The target-ad identifier 222 is responsible for identifying, with respect to each target 220, one or more entities 218 based on information related to the entities 218, such as the information stored in the advertisement archive 206, promotion archive 208, and advertiser profile archive 210. The identified entities for each target may be stored in the target-ad archive 226 and retrieved by the advertising serving mechanism 204 to deliver the corresponding content, e.g., advertisements, promotion messages, to each target 220. The ad-target identifier 224, on the other hand, is configured to identify one or more targets 220 for each entity 218 based on information related to the targets 220, such as the information stored in the target-related content archive 212, target activity archive 214, and target profile archive 216. The identified targets for each entity may be stored in the ad-target archive 228. Each entity 218 then may conduct targeted advertising to their identified most-wanted audiences through the bi-directional advertising network platform 202, e.g., by delivering advertisement and promotion content to the targets 220. The feedback of the delivered content may be received from one or more targets 220 and provided to the entities 218 through the same bi-directional advertising network platform 202.

Figure 3:
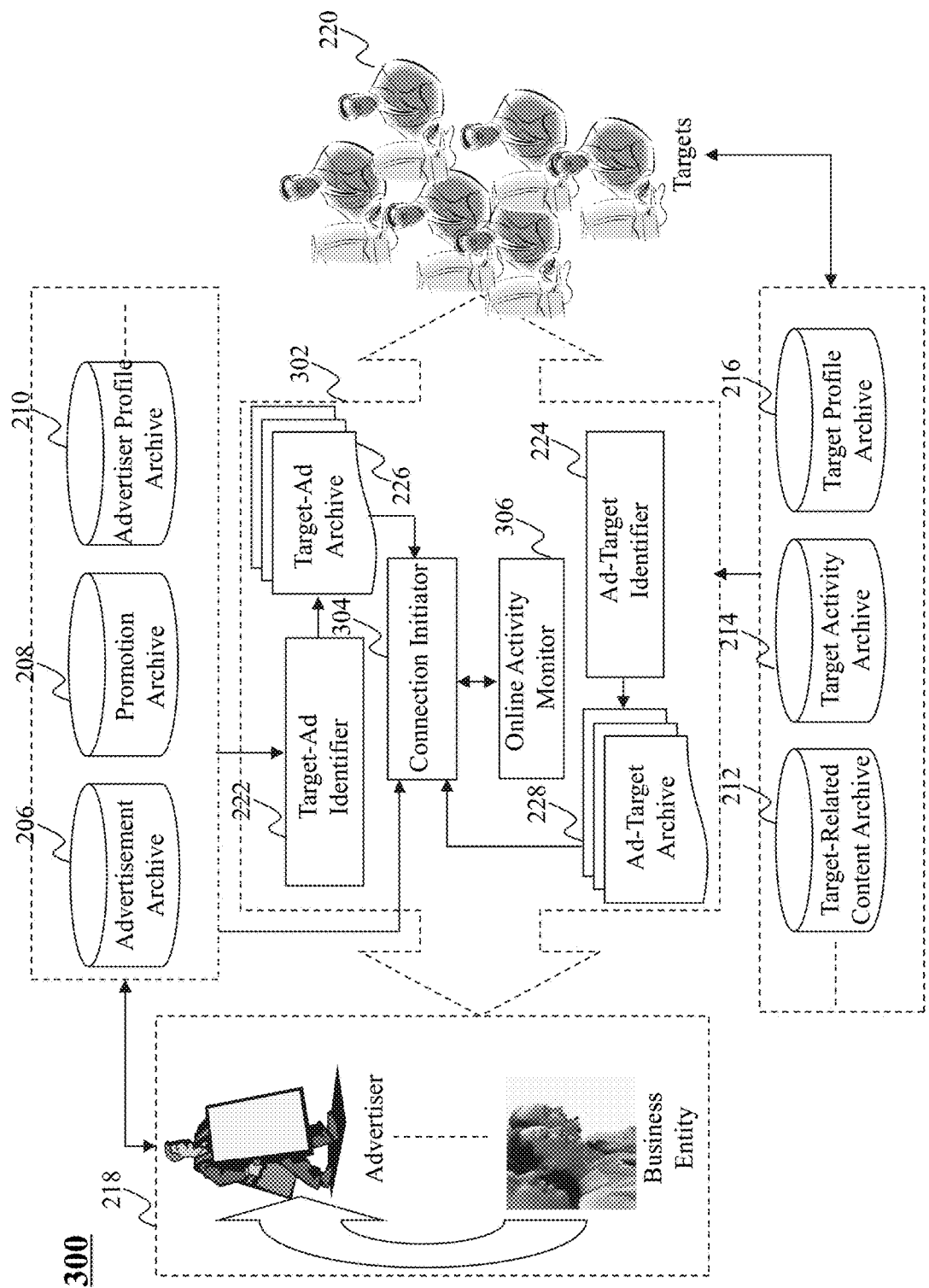
FIG. 3 is another high level exemplary system diagrams of a system for online advertising, according to an embodiment of the present teaching.

FIG. 3 is another high level illustration of a system for online advertising, according to an embodiment of the present teaching. The system 300 in this example is adapted to any social network platform, such as but not limited to, FACEBOOK, TWITTER, LINKEDIN, RENREN, WEIBO, QQ, etc. In addition to the target-ad identifier 222, ad-target identifier 224, target-ad archive 226, and ad-target-archive 228 as descried above in FIG. 2, the bi-directional advertising network platform 302 in this example further includes a connection initiator 304 and an online activity monitor 306. The connection initiator 304 in this example is configured to establish a connection between an entity 218 and a target 220 through a bi-directional communication channel on a social network platform. In one example, the connection initiator 304 may be responsible for creating an account for the entity 218 and/or the target 220 on the social network platform and recommend the entity account to the targets 220 to follow the entity 218. Once the recommendation is accepted, the entity 218 may deliver content, such as advertisement or promotion content, to the target account in the form of a social network message, for example. The target 220, in response to the delivered content, may provide feedback to the entity account in the form of a social network message or activity, such as clicking, commenting, liking/disliking, or forwarding. In another example, once the targets 220 are identified, the list of targets may be provided to the entity 218 to determine whether an invitation to follow the entity 218 should be sent to the identified targets 220. That is, in this example, the connection initiator 304 may be responsible for facilitating the entity 218 to send invitations to the identified targets 220 to follow the entity 218 on the social network platform. Once the invitation is accepted, the entity 218 may deliver content, such as advertisement or promotion content, to the target account in the form of a social network message, for example. The target 220, in response to the delivered content, may provide feedback to the entity account in the form of a social network message or activity, such as clicking, commenting, liking/disliking, or forwarding.

The online activity monitor 306 in this example is configured to monitor activities between the entity 218 and target 220 through the bi-directional communication channel. The activities include any online activities performed by the entity 218 or the target 220 on the social network platform through the bi-directional communication channel, such as information exchange in the form of social network messages, account creation, connection establishment or termination, or responding to received messages, e.g., clicking, commenting, liking/disliking, forwarding. The monitored activities may be applied by the entities 218 to facilitate the entities 218 to determine whether to send content to each identified target 220. The monitored activities may be also utilized by the bi-directional advertising network platform 302 to calculate a monetary mount to be charged to the entities 218 based on information related to the monitored activities in accordance with any suitable monetization schemes.

Figure 4:
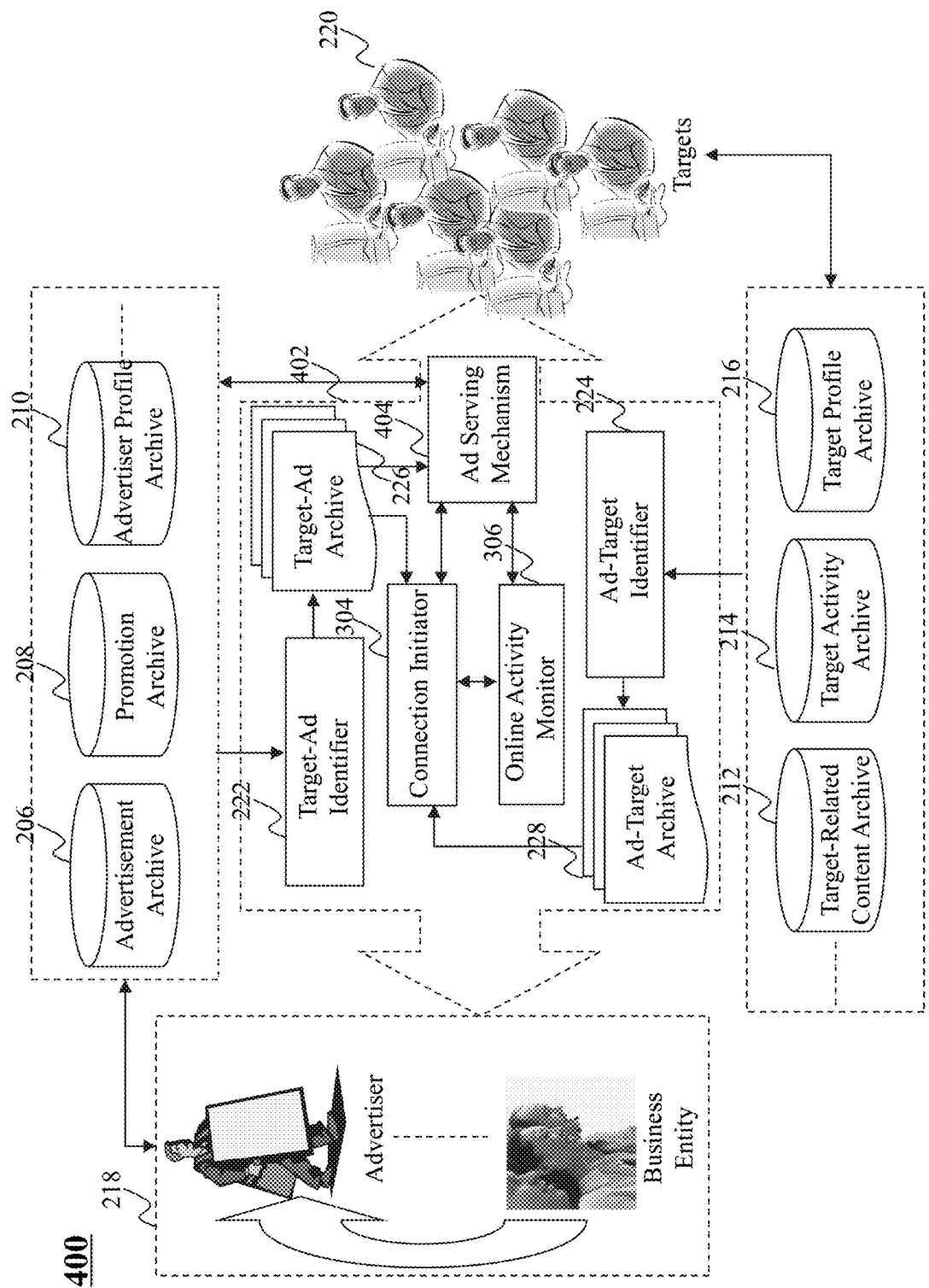
FIG. 4 is still another high level exemplary system diagrams of a system for online advertising, according to an embodiment of the present teaching.

FIG. 4 is still another high level illustration of a system for online advertising, according to an embodiment of the present teaching. The system 400 in this example is similar to the system 300 shown in FIG. 3 except that the bi-directional advertising network platform 402 in this example further includes an advertising serving mechanism 404 as part of the bi-directional advertising network platform 402. Thus, the display format of the advertising content in this example may be different from the one in the system 300, i.e., social network messages. For example, the advertising serving mechanism 404 may retrieve the advertising content from the advertisement archive 206 or promotion archive 208 for a specific entity 218 and display the content as regular display advertising on the web pages of the identified targets' 220 social network accounts. In this case, the impressions of the display advertising may be also taken into account in calculating the monetary mount to be charged to the entities 218.

Figure 5:
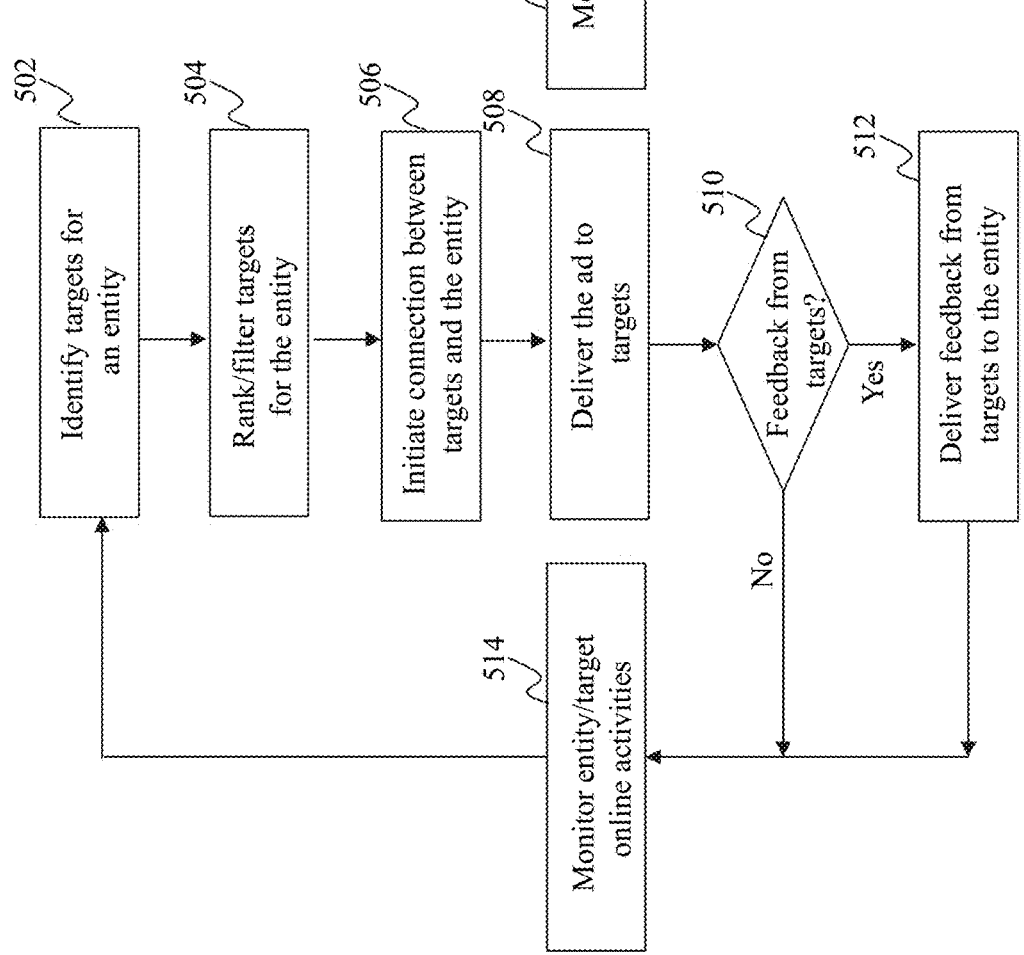
FIG. 5 is a flowchart of an exemplary process of the system for online advertising, according to an embodiment of the present teaching.

FIG. 5 is a flowchart of an exemplary process of online advertising, according to an embodiment of the present teaching. Starting from block 502, one or more targets are identified for an entity. The targets are considered as likely being interested in content that can be made available by the entity. At block 504, if there are more than one target that has been identified at block 502, the targets are ranked and filtered based on various parameters, such as the relevance with respect to the entity, the influence level in the social network settings, or purchasing intent and probability. Moving to block 506, a connection between the entity and each identified target is established through a bi-directional communication channel. At block 508, content, e.g., advertisements, is delivered by the entity to each identified target through the bi-directional communication channel. At block 510, whether an identified target provides any feedback in response to the delivered content is determined. If so, at block 512, the feedback is delivered to the entity through the bi-directional communication channel. Nevertheless, at block 514, activities between the entity and each target through the bi-directional communication channel are monitored.

Figure 6:
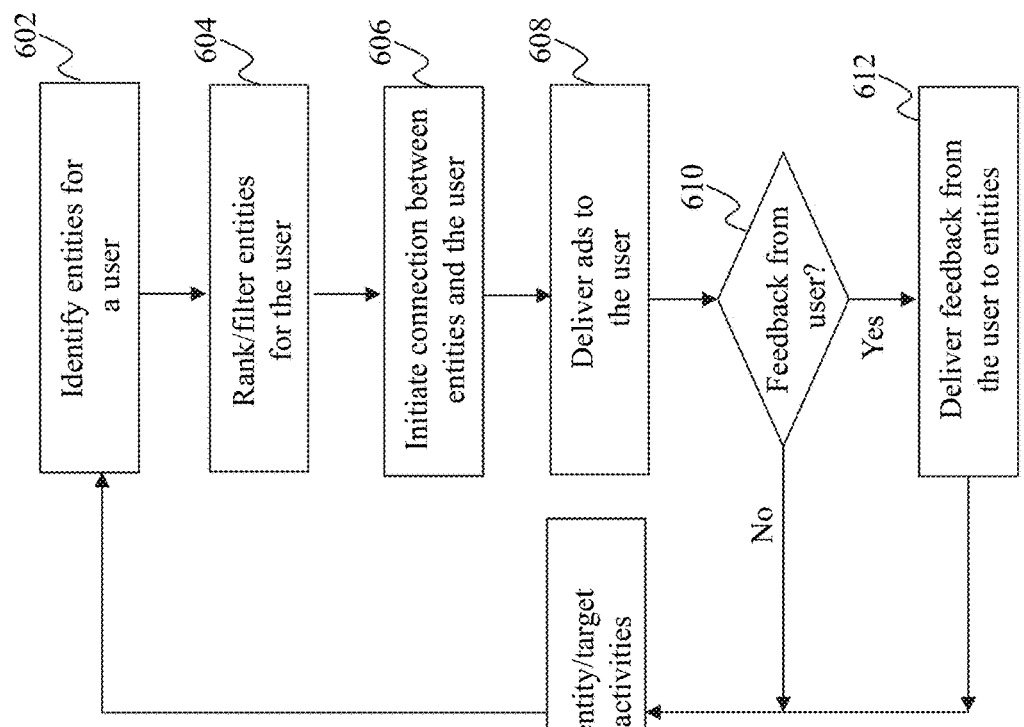
FIG. 6 is a flowchart of another exemplary process of the system for online advertising, according to an embodiment of the present teaching.

FIG. 6 is a flowchart of another exemplary process of online advertising, according to an embodiment of the present teaching. Starting from block 602, one or more entities are identified for a user. Each identified entity is capable of providing content, and the one or more identified entities are considered as likely having content that is of interest of the user. At block 604, if there are more than one entity that has been identified at block 602, the entities are ranked and filtered based on various parameters, such as the relevance with respect to the user. Moving to block 606, a connection between the user and each identified entity is established through a bi-directional communication channel. At block 608, content, e.g., advertisements, is delivered by each identified entity to the user through the bi-directional communication channel. At block 610, whether the user provides any feedback in response to the delivered content is determined. If so, at block 612, the feedback is delivered to the entities through the bi-directional communication channel. Nevertheless, at block 614, activities between the user and each identified entity through the bi-directional communication channel are monitored. Optionally, one or more pieces of content that can be made available by each identified entity may be further identified and ranked based on various parameters, such as the relevance with respect to the user and the effectiveness of delivering each piece of content by the entity.

It is understood that although FIG. 5 and FIG. 6 are directed to aspects of identifying and ranking targets for an entity and identifying and ranking entity for a user, respectively, the processes in FIG. 5 and FIG. 6 may be combined in other examples. That is, the most-relevant and influential users for each entity may be identified first based on user social and behavior analysis and mining. Given that an identified user (target) may be interested in multiple entities/advertisements, entities/advertisements may be further identified and ranked with respect to the specific target in the same process.

Figure 7:
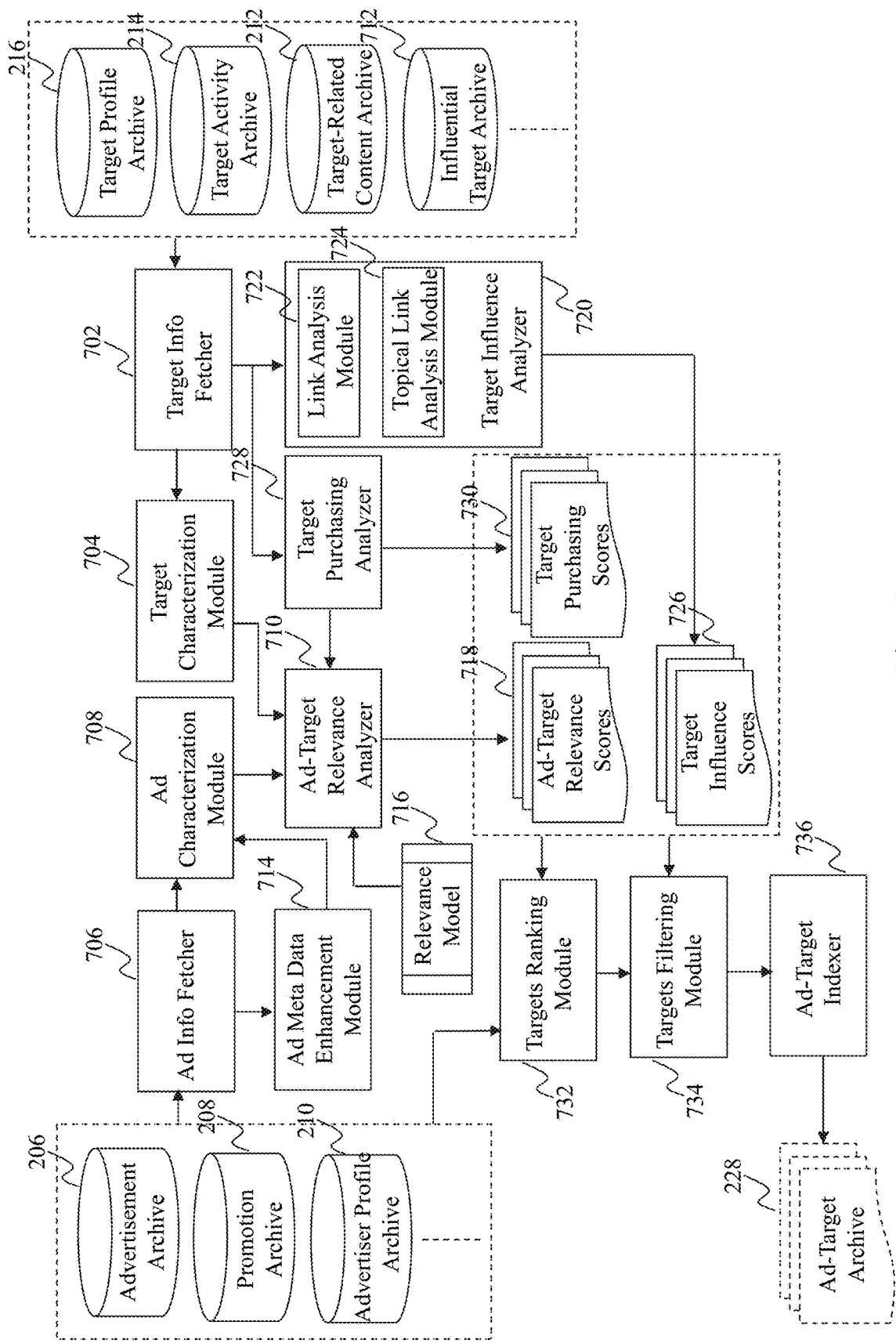
FIG. 7 is a system diagram for an exemplary ad-target identifier of the system for online advertising, according to an embodiment of the present teaching.

FIG. 7 is a system diagram for an exemplary ad-target identifier of the system for online advertising, according to an embodiment of the present teaching. The ad-target identifier 224 includes a target information fetcher 702, a target characterization module 704, an advertising information fetcher 706, an advertising characterization module 708, and an ad-target relevance analyzer 710. The target information fetcher 702 in this example is responsible for fetching information related to each target from the various target-related information archives. The target-related information archives include, for example, the target profile archive 216 storing information reflecting profile of each target (e.g., gender, age, location, occupation, etc.), the target activity archive 214 storing information about online activities of each target (e.g., browsing behaviors, actions in social network environments, etc.), the target-related content archive 212 storing information about content related to each target (e.g., articles, text, video, and audio that are created or consumed by each target), and an influential target archive 712 storing information related to a social influence level of each target. It is understood that any other suitable target-related information archive may be included as well. For example, an information archive storing information reflecting a purchasing behavior of each target (e.g., online purchasing history data) may be available for providing purchasing behavior information to the target information fetcher 702. The target characterization module 704 is configured to characterize each target based on the corresponding target-related information fetched from the various information archives to create a plurality of target vectors.

The target vectors include, for example, a category vector, a keyword vector, or a latent variable vector for reflecting each target's interest.

Similarly, the advertising information fetcher 706 is configured to fetch entity-related information from various entity-related information archives. In this example, the advertiser profile archive 210 may include information reflecting profile of each entity (e.g., location, products, etc.); the advertisement archive 206 and promotion archive 208 may include information about each piece of content to be delivered by the entity (e.g., product promotions, new model releases, celebrity endorsements, etc.). It is understood that, some of the entity-related information may be obtained through the metadata of the content to be delivered by the entity, and an advertising metadata enhancement module 714 may be applied to obtain more entity-related information through enhancement and enrichment of the metadata. Nevertheless, all the obtained entity-related information is fed into the advertising characterization module 708 to create entity vectors by characterizing each entity's related information. In this example, the entity vectors include, for example, a category vector, a keyword vector, or a latent variable vector for reflecting each entity's interest. It is understood that, for each piece of content, e.g., an advertisement to be delivered by an advertiser, content vectors may be created as well to reflect each piece of content's topic. That is, the characterization of entity-related information may be performed at both the entity level and content level. For example, each advertiser may be characterized to profile its interest, while each advertisement of the advertiser may be further characterized to specify a fine topic. In one example, an advertiser may be characterized under the category of "cars," and advertisements that can be made available by this advertiser may be further characterized under the various categories, for example, "vans," "sports cars," "hybrid cars," "Toyota," etc.

In this example, the ad-target relevance analyzer 710 is configured to analyze the relevance between each pair of entity and target based on a relevance model 716 to generate an ad-target relevance score 718 for each pair of entity and target. In this example, the relevance model 716 may be any suitable machine learned matching function between the target vectors and entity vectors. For a given entity, e.g., an advertiser, or an advertisement, relevance scores 718 for the targets are obtained by applying the machine learned matching function.

In this example, the ad-target identifier 224 further includes a target influence analyzer 720 for calculating target influence scores 726 based on the information related to the social influence level of each target. The target influence analyzer 720 may include a link analysis module 722 configured to apply link analysis, such as PageRank or any suitable web-linked based ranking algorithms to social networks based on targets' social connections. Each target's influence score 726 may be affected by its page ranking calculated by the link analysis module 722. The target influence analyzer 720 may also include a topical link analysis module 724 configured to apply topical link propagation algorithms, such as topical PageRank, to the social networks. One or more high influence targets may be identified, as labeled seeds, on the social network platforms first before applying the topical link propagation algorithms. The high influence targets may be celebrities in the social networks, who have been manually classified into predetermined categories/topics. The celebrities may be automatically determined, for example, by the number of followers on the social network platforms or manually verified. Followers of the high influence target in the social networks are deemed as targets influenced by the identified high influence target and likely have the same topic of interest of the high influence target. In this example, both the results from the link analysis module 722 and topical link analysis module 724 for a given target is combined into the target influence score 726, which is independent of any entity.

In this example, the ad-target identifier 224 further includes a target purchasing analyzer 728 responsible for calculating target purchasing scores 730 reflecting each target's purchasing intent and probability based on, for example, the target's online purchasing history and pattern. As purchasing intent and probability are important for the effectiveness of online advertising, target purchasing scores 730 may be considered as a boost factor in this example and provided to the targets ranking module 732 and targets filtering module 734, along with the ad-target relevance scores 718 and the target influence scores 726. In this example, different scores may be combined for each entity-target pair with the same or different weights. The combined score is applied by the targets ranking module 732 to rank all available targets for a given advertiser or advertisement. The targets filtering module 734 may apply different rules to filter out certain targets. In one example, each entity may specify or constrain a maximum number N of targets they are interested in, so only the top N ranked targets are kept after filtering. In another example, targets that have voluntarily followed the entity on any social network platform may be excluded by the targets filtering module 734. An ad-target indexer 736 may be responsible for making index of identified targets for each entity and store the index into the ad-target archive 228.

Figure 8:
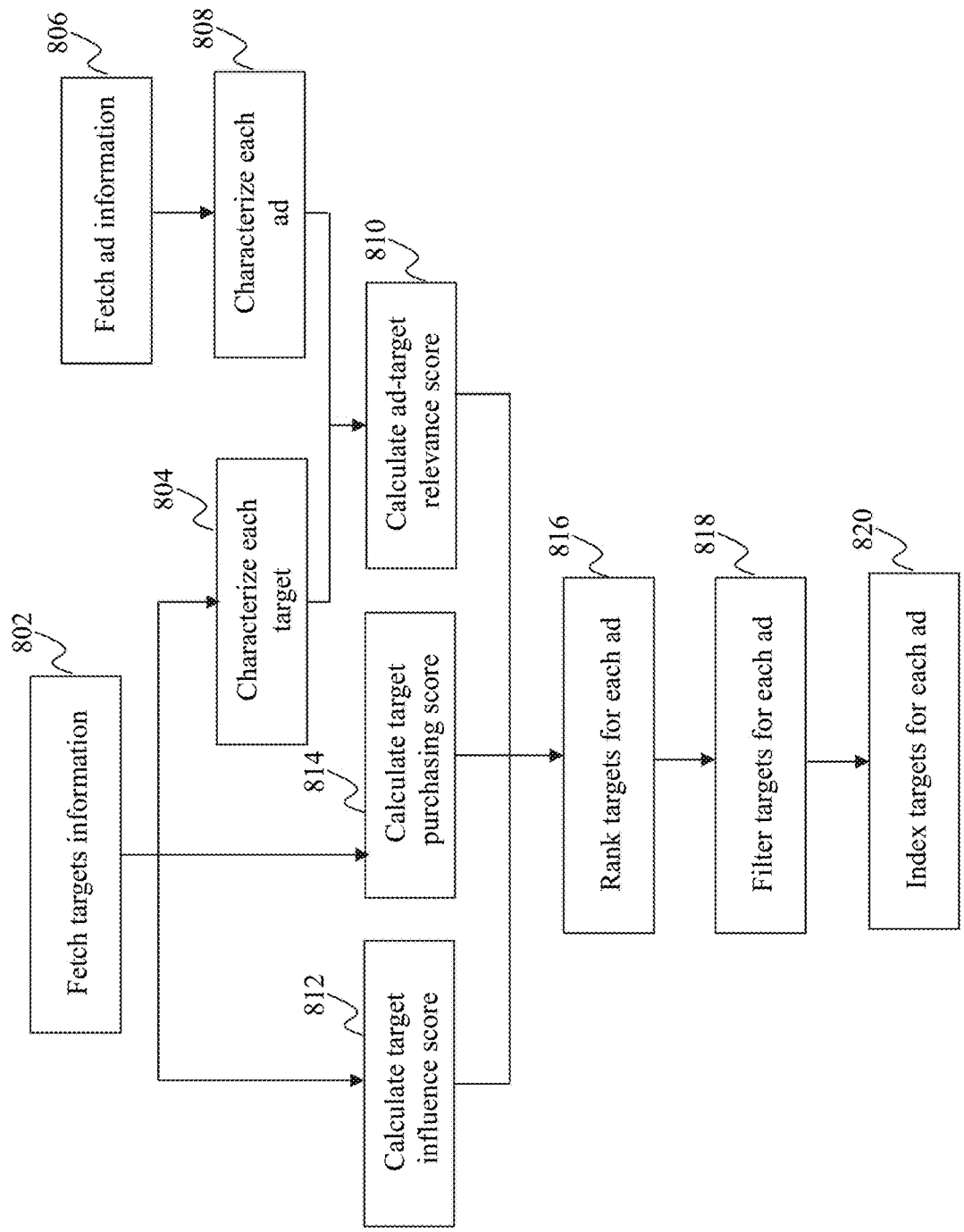
FIG. 8 is a flowchart of an exemplary process of the ad-target identifier, according to an embodiment of the present teaching.

FIG. 8 is a flowchart of an exemplary process of the ad-target identifier, according to an embodiment of the present teaching. Starting from block 802, information related to targets is fetched. The information includes, for example, information reflecting profile of each target, information about online activities of each target, information about content related to each target, information related to a social influence level of each target, and information reflecting a purchasing behavior of each target. At block 804, each target is characterized based on corresponding fetched information to create target vectors. At block 806, information related to each advertiser or advertisement is fetched, such as information reflecting profile of the advertiser, information about each advertisement, and information about effectiveness of delivering each advertisement by the advertiser. At block 808, each advertiser or advertisement is characterized based on the corresponding fetched information to create entity or content vectors. Moving to block 810, the target vectors and entity or content vectors are used to calculate ad-target relevance scores based on, for example, any machine learned matching function. At block 812, target influence scores are also calculated based on each target's social influence level. At block 814, target purchasing scores are calculated as a boost factor based on each target's purchasing behavior. Proceeding to block 816, for each advertiser or advertisement, all the available targets are ranked based on a score combing the ad-target relevance score, target influence score, and target purchasing score. At block 818, certain targets may be excluded from consideration, leaving the rest targets as the identified targets for each advertiser or advertisement. Eventually, at block 820, identified targets for each advertiser or advertisement are indexed.

Figure 9:
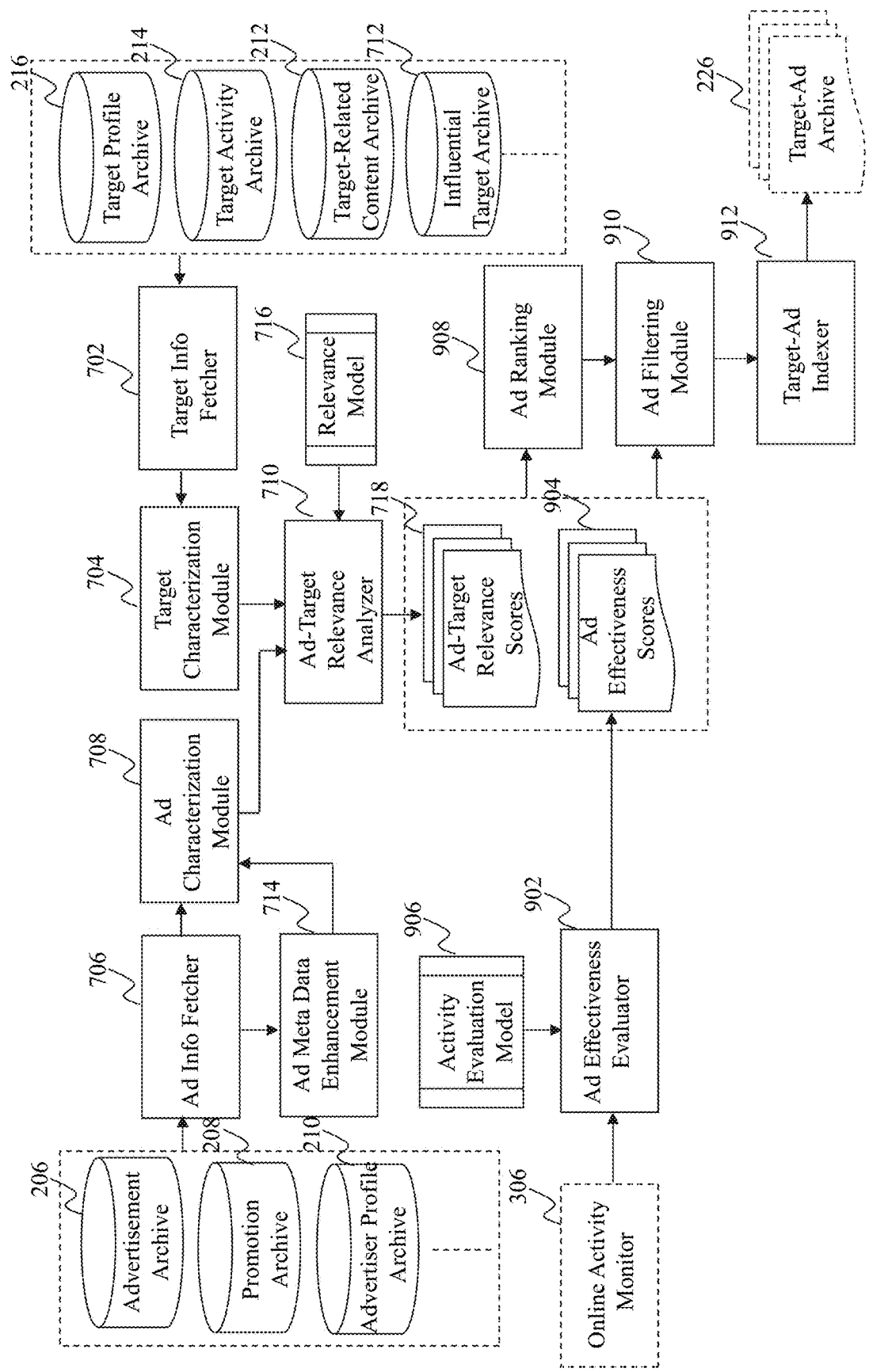
FIG. 9 is a system diagram for an exemplary target-ad identifier of the system for online advertising, according to an embodiment of the present teaching.

FIG. 9 is a system diagram for an exemplary target-ad identifier of the system for online advertising, according to an embodiment of the present teaching. The same components that have been described above in FIG. 7 will not be described again. The target-ad identifier 222 in this example further includes an advertising effectiveness evaluator 902 configured to calculate advertising effectiveness scores 904 for all the entities, e.g., advertisers, and their advertisements based on their online activities monitored by the online activity monitor 306 in accordance with an activity evaluation model 906. For example, the activity evaluation model 906 may be any suitable statistical machine learning model. In one example, various web search click modeling techniques may be applied where the acceptance of a connection request from an entity corresponds to a click (therefore a positive example). As described above, ad-target relevance scores 718 may be also calculated by the ad-target relevance analyzer 710 for each entity-target pair. The advertising effectiveness scores 904 and relevance scores 718 are combined and provided to the advertising ranking module 908 and advertising filtering module 910 to identify one or more entities, e.g., advertisers, or advertisements for each target (user). It is noted that, the ranking and filtering of the advertisers or advertisements may be also affected by a bid rate (cost per byte per follower at a certain position) in a second-price auction model. The second price may be charged for the entity as part of the monetization scheme. A target-ad indexer 912 may be responsible for making index of identified advertisers or advertisements for each user and store the index into the target-ad archive 226.

Figure 10:
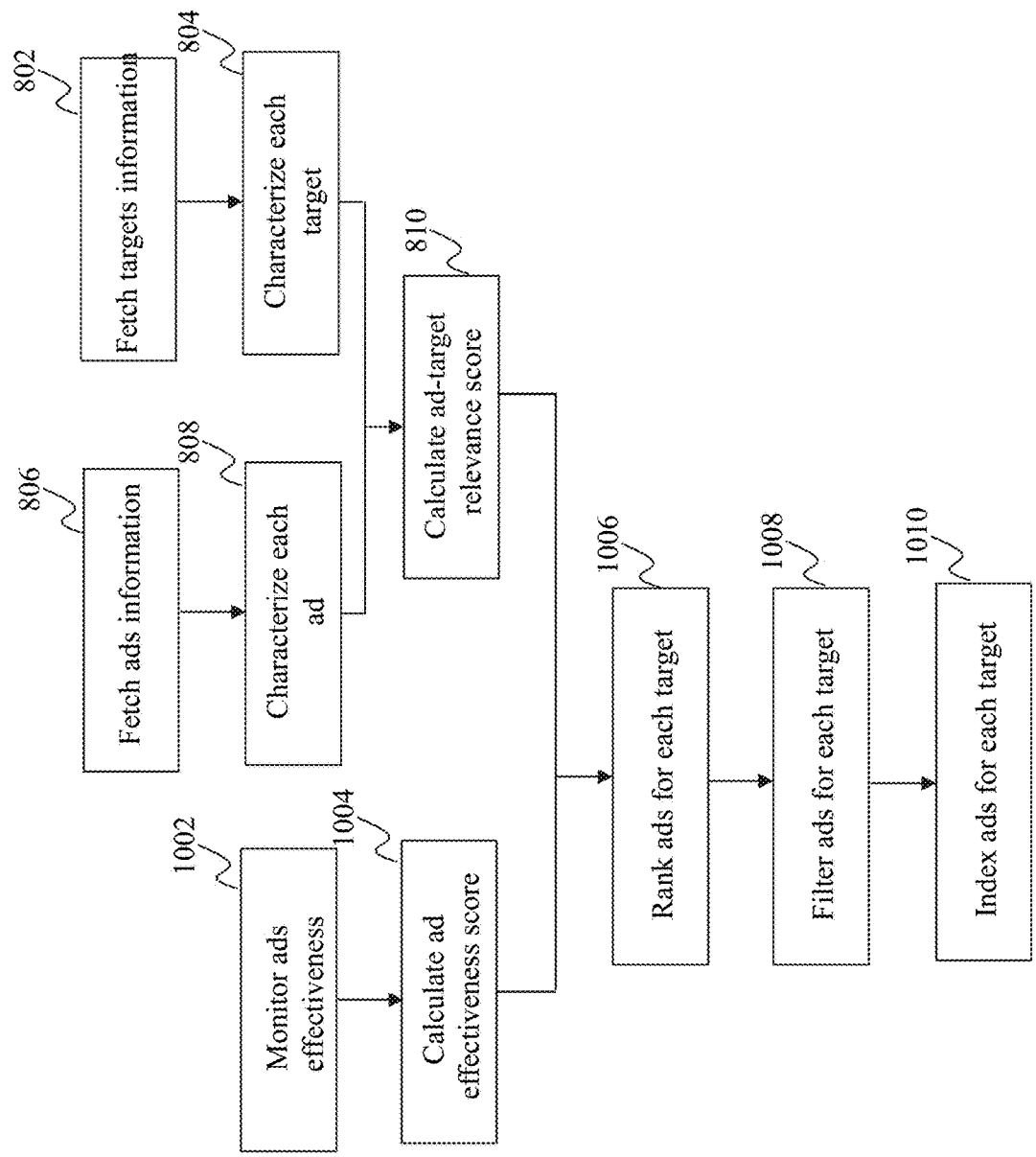
FIG. 10 is a flowchart of an exemplary process of the target-ad identifier, according to an embodiment of the present teaching.

FIG. 10 is a flowchart of an exemplary process of the target-ad identifier, according to an embodiment of the present teaching. Starting from block 802, information related to targets is fetched. The information includes, for example, information reflecting profile of each target, information about online activities of each target, information about content related to each target, information related to a social influence level of each target, and information reflecting a purchasing behavior of each target. At block 804, each target is characterized based on corresponding fetched information to create target vectors. At block 806, information related to each advertiser or advertisement is fetched, such as information reflecting profile of the advertiser, information about each advertisement, and information about the effectiveness of delivering each advertisement by the advertiser. At block 808, each advertiser or advertisement is characterized based on the corresponding fetched information to create entity or content vectors. Moving to block 810, the target vectors and entity or content vectors are used to calculate ad-target relevance scores based on, for example, any machine learned matching function. At block 1002, online activities between the entities and targets that reflect the effectiveness of delivering content, e.g., advisements, to the users, are monitored. At block 1004, effectiveness scores are calculated based on the monitored activities in accordance with, for example, any suitable web search click models. Proceeding to block 1006, for each user, all the available advertisers or advertisements are ranked based on a score combing the ad-target relevance score and advertising effectiveness score. At block 1008, certain advertisers or advertisements may be excluded from consideration, leaving the rest advertisers or advertisements as the identified advertisers or advertisements for each user. Eventually, at block 1010, identified advertisers or advertisements for each user are indexed.

Figure 11:
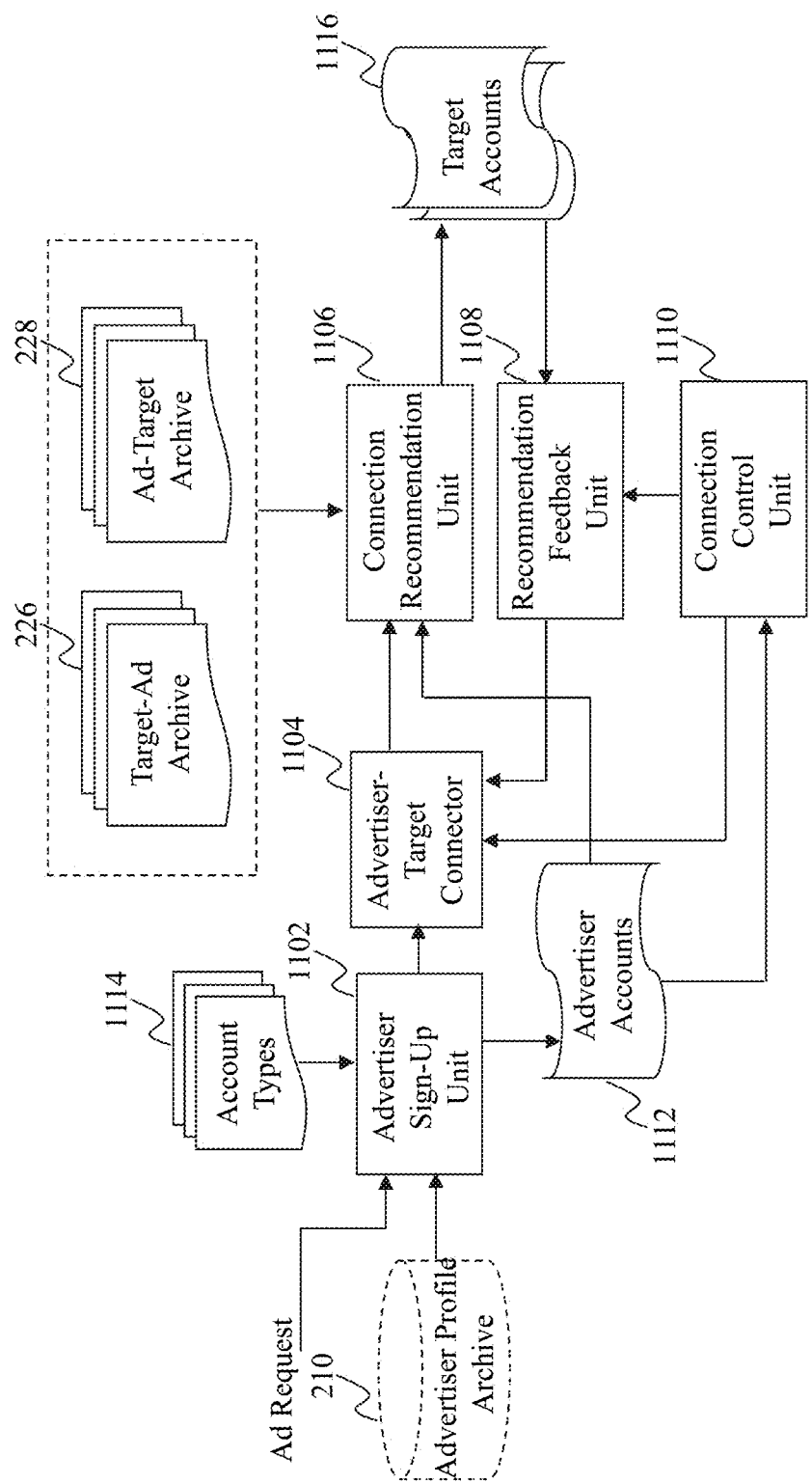
FIG. 11 is a system diagram for an exemplary connection initiator of the system for online advertising, according to an embodiment of the present teaching.

FIG. 11 is a system diagram for an exemplary connection initiator of the system for online advertising, according to an embodiment of the present teaching. The connection initiator 304 includes an advertiser sign-up unit 1102, an adver-tiser-target connector 1104, a connection recommendation unit 1106, a recommendation feedback unit 1108, and a connection control unit 1110. The advertiser sign-up unit 1102 is configured to, in response to a request, create an advertiser account 1112 for each advertiser on the social network platform based on the profile of the advertiser retrieved from the advertiser profile archive 210. Different account types 1114 may be assigned to the advertiser accounts 1112 and may affect the relationship between the advertiser and the identified targets on the social network platform. The advertiser-target connector 1104 is responsible for establishing the bi-directional communication channel between the advertiser accounts 1112 and the target accounts 1116 on the social network platform. In this example, the connection recommendation unit 1106 may recommend the advertiser account 1112 to the corresponding identified targets to follow based on the index stored in the ad-target archive 228. In response to the recommendation, the target accounts 1116 may accept, reject, or ignore the recommendation through the recommendation feedback unit 1108. The results are then provided to the advertiser-target connector 1104 to determine whether a bi-directional communication channel can be established and what kind of relationship exists between the advertiser account 1112 and the corresponding target account 1116. In one example, a permanent/premium relationship does not expire as long as the target does not explicitly disable the connection. In another example, a temporary/short-term relationship may be established so that the connection is valid during a specified period of time, for example, for a seasonal advertising campaign. In still another example, an implicit relationship means that the target does not explicitly accept the following recommendation. In this example, the connection between each advertiser account 1112 and the corresponding target account 1116 may be maintained and controlled by the connection control unit 1110. For example, for any communication channel built upon the temporary/short-term relationship, the connection control unit 1110 may terminate the connection once the specified period of time is over. It is understood that, although FIG. 11 describes the connection initiator 304 from the entity's (advertiser) perspective, the same mechanism may be used to create a target account 1116 for a user and recommend the target account 1116 to an advertiser account 1102 to follow, i.e., in the opposite way.

Figure 12:
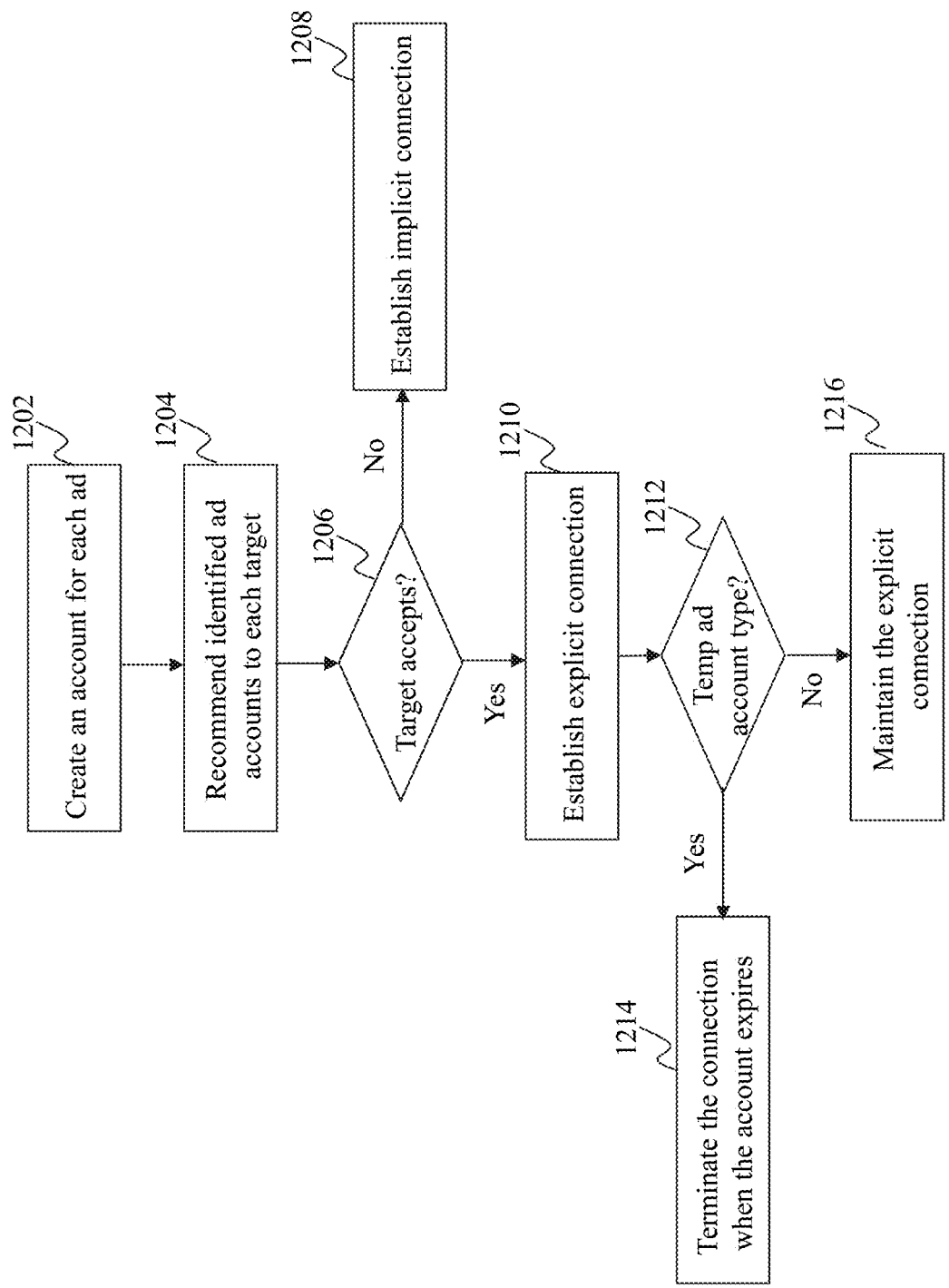
FIG. 12 is a flowchart of an exemplary process of the connection initiator, according to an embodiment of the present teaching.

FIG. 12 is a flowchart of an exemplary process of the connection initiator, according to an embodiment of the present teaching. Beginning at block 1202, an account is created for each advertiser on the social network platform. At block 1204, for each identified target, the corresponding advertiser accounts are recommended for the target to follow. At block 1206, if the target does not accept the recommendation of a specific advertiser account, then an implicit connection is established between the target account and the advertiser account at block 1208. If the target accepts the recommendation to follow at block 1206, an explicit connection is built at block 1210. Whether the advertiser account is a temporary/short-term type is determined at block 1212. If so, the connection between the temporary/short-term advertiser account and the target account is terminated at block 1214 when the account expires. Otherwise, the advertiser account is a permanent/premium type, and the explicit connection between the permanent/premium advertiser account and the target account is maintained at block 1216 unless the target account explicitly terminates the connection.

Figure 13:
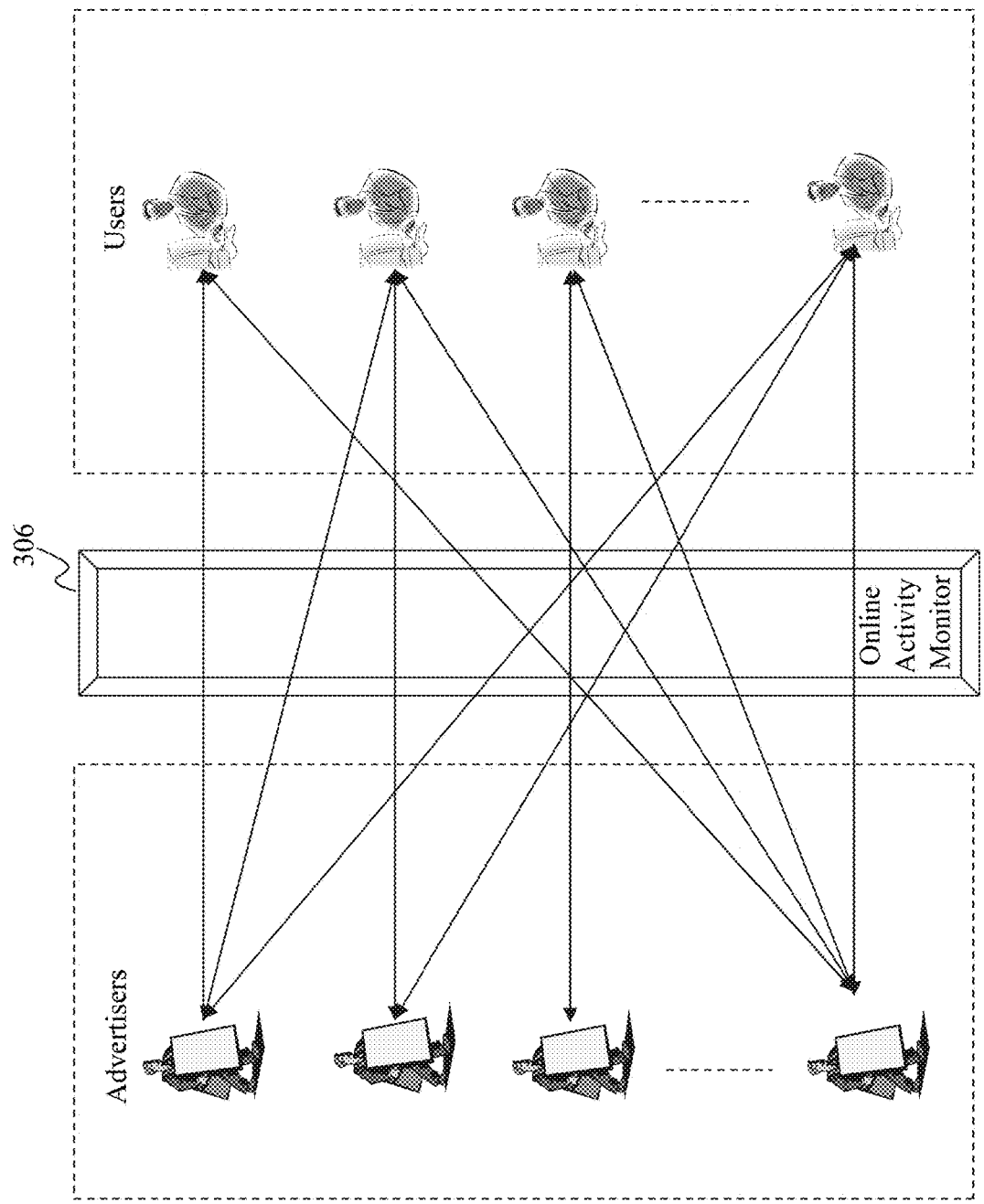
FIG. 13 depicts bi-directional communication channels established between entities and targets, according to an embodiment of the present teaching.

FIG. 13 depicts bi-directional communication channels established between entities and targets, according to an embodiment of the present teaching. Once the connection initiator 304 establishes the direct connections between the entities and corresponding targets on the social network platform, a bi-directional real-time communication channel is available for each pair of entity and target to exchange information directly. For example, the advertisers may broadcast content, such as product promotions, new model releases, celebrity endorsements, to their followers, i.e., identified users, in the form of social network messages. Meanwhile, the identified users may provide timely and direct feedback to the advertisers, or forward and comment the messages to their friends. Once the connections are established on the social network platforms, the communication is bi-directional, and the users can provide their feedback via the same channel. As shown in FIG. 13, all the activities between the advertisers and users through the bi-directional communication channels are monitored by the online activity monitor 306 of the system 300, 400, and the information related to the monitored activities may be used for determining the monetary amount to be charged to the advertisers.

It is understood that, the connections between the advertisers and users may be symmetric or asymmetric. As described above, for a given entity (advertiser) "A," the system 300, 400 may identify one or more corresponding targets (users) "a," "b," . . . "n." On the other hand, for a given target "a," the system 300, 400 may also identify one or more corresponding entities. If the entity "A" is also identified as the one of the corresponding entities for the target "a," then the connection between entity "A" and target "a" is symmetric. If the entity "A" is not identified as one of the corresponding entities for target "a," then the connection is asymmetric. For example, the system 300, 400 may identify a celebrity as one of the most-wanted audience for an advertiser of economical cars because of the celebrity's high social influence and purchasing intent of cars. However, when the system 300, 400 identifies potential entities, e.g., car manufacturers, dealerships, and advertisers of cars, for the celebrity, the advertiser of economical cars may be not on the identified entity list. In this situation, the connection is asymmetric in the sense that only the target is recommended to the entity, but the entity is not recommended to the same target. In one example, the system 300, 400 may restrict that only symmetric connections are valid. In other examples, the asymmetric connections may be also kept by the system 300, 400, and different monetization schemes may be applied to symmetric connections and asymmetric connections. For example, a higher rate may be charged to the advertiser for a symmetric connection than an asymmetric connection.

Figure 14:
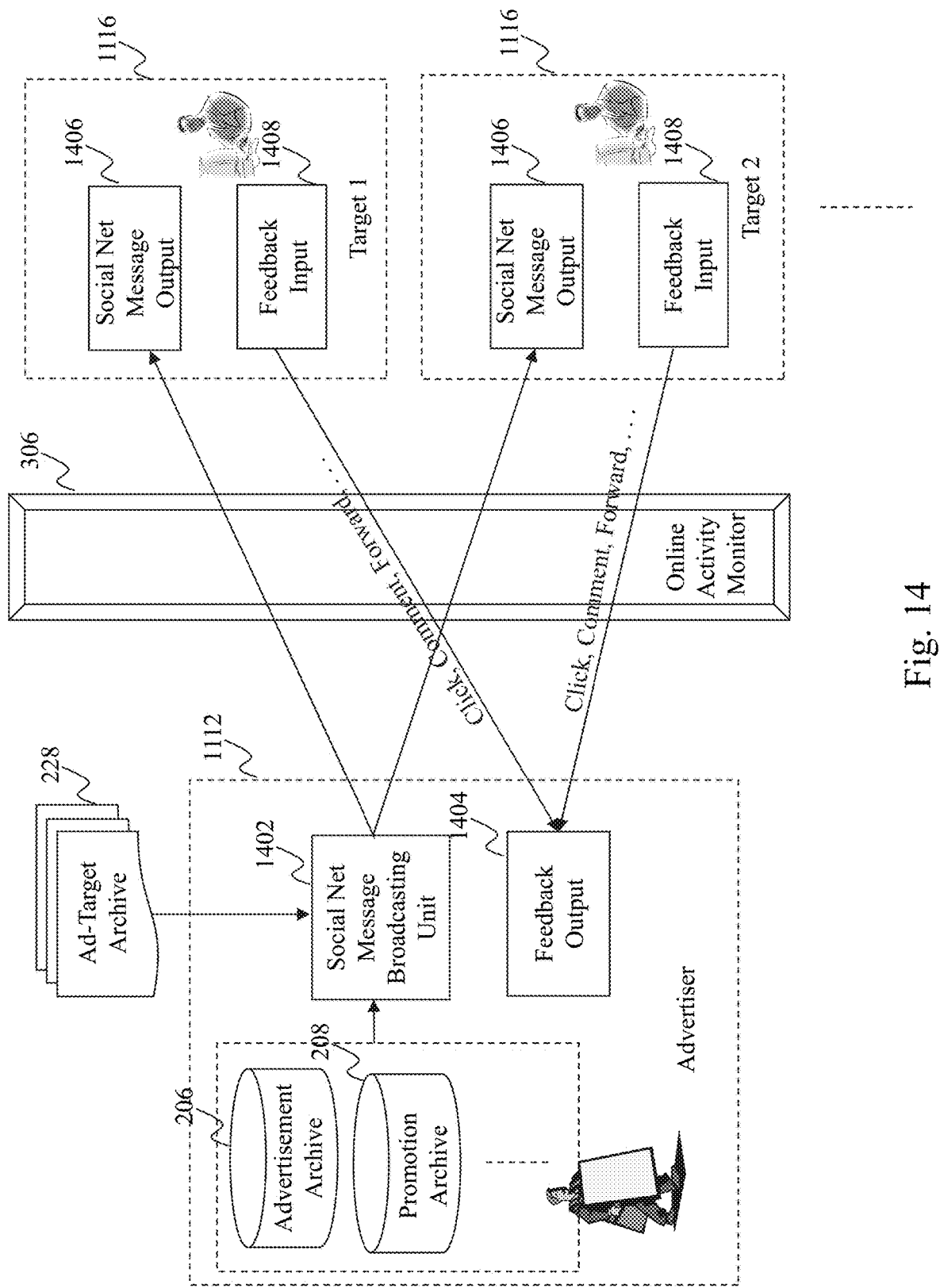
FIG. 14 depicts information exchange through bi-directional communication channels established between one entity and multiple targets on a social network platform, according to an embodiment of the present teaching.

FIG. 14 depicts information exchange through bi-directional communication channels established between one entity and multiple targets on a social network platform, according to an embodiment of the present teaching. In this example, a plurality of targets are identified for the advertiser, and the bi-directional communication channels are established between the advertiser account 1112 and the target accounts 1116. The advertiser account 1112 on the social network platform may include a social network message broadcasting unit 1402 and a feedback output 1404. The social network message broadcasting unit 1402 may be any suitable mechanism on the social network platform to broadcast messages to its followers, such as status updating, posting, forwarding, private messaging, etc. The messages are broadcasted to all the identified targets based on the index in the ad-target archive 228, and the content of the messages is retrieved from the available archives, such as the advertisement archive 206 or promotion archive 208. Each target account 1116 includes a social network message output 1406 for presenting the received messages from the advertiser account 1112 either in the regular message display section of the account or in a separate "sponsored" section. Each target account 1116 may also include a feedback input 1408 for providing feedback in response to the received messages. The feedback includes, for example, clicking, commenting, forwarding, liking/disliking, etc. The feedback is transmitted to the advertiser account 1112 through the bi-directional communication channel.

Figure 15:
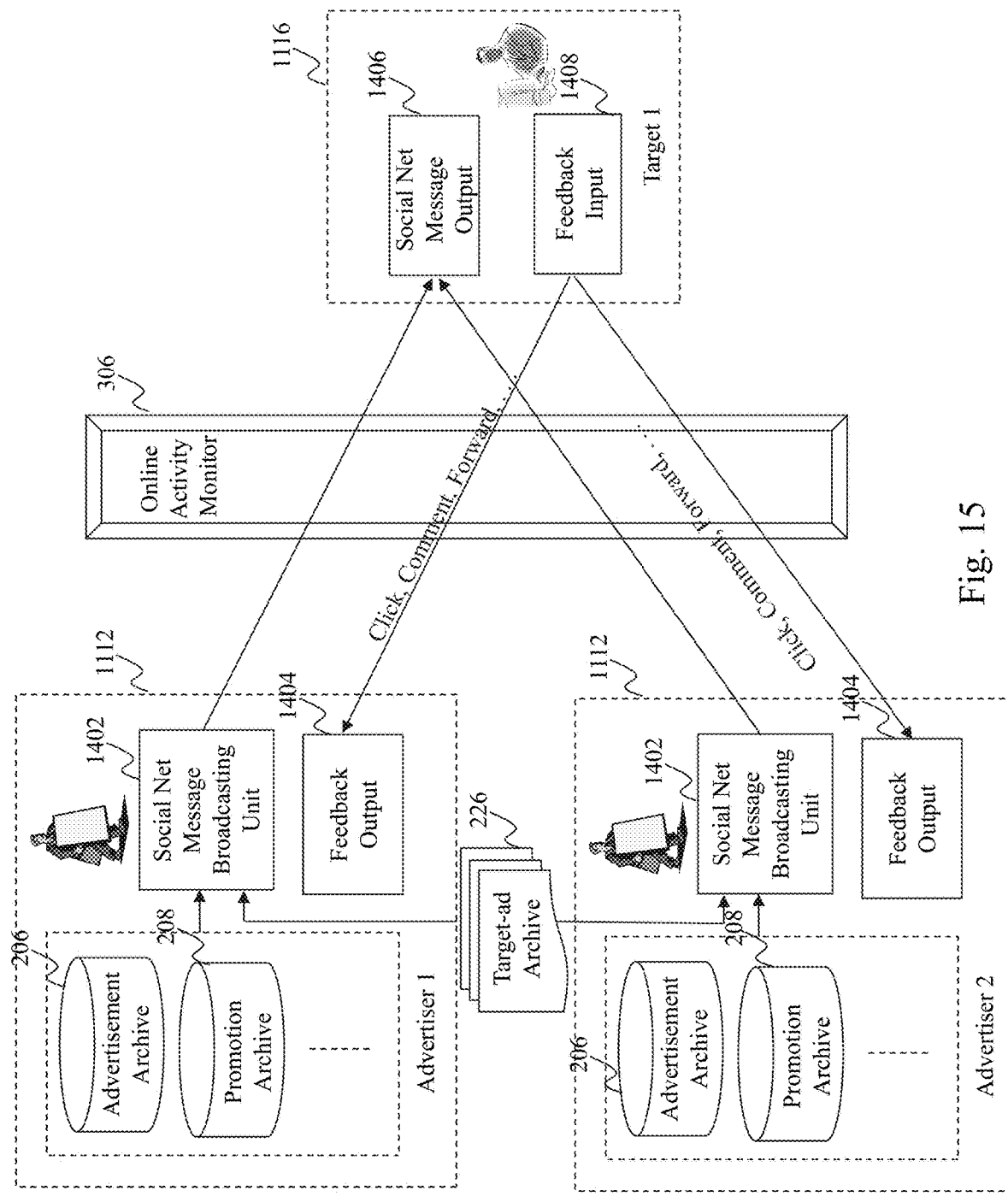
FIG. 15 depicts information exchange through bi-directional communication channels established between multiple entities and one target on a social network platform, according to an embodiment of the present teaching.

FIG. 15 depicts information exchange through bi-directional communication channels established between multiple entities and one target on a social network platform, according to an embodiment of the present teaching. In this example, a plurality of entities (advertisers) are identified for the target (user), and the bi-directional communication channels are established between the advertiser accounts 1112 and the target account 1116. Different from FIG. 14, the index stored in the target-ad archive 226, instead of the ad-target archive 228, is applied by the social network message broadcasting units 1402 of the identified advertiser accounts 1112 in order to determine the target account 1116 where the messages are transmitted.

Figure 16:
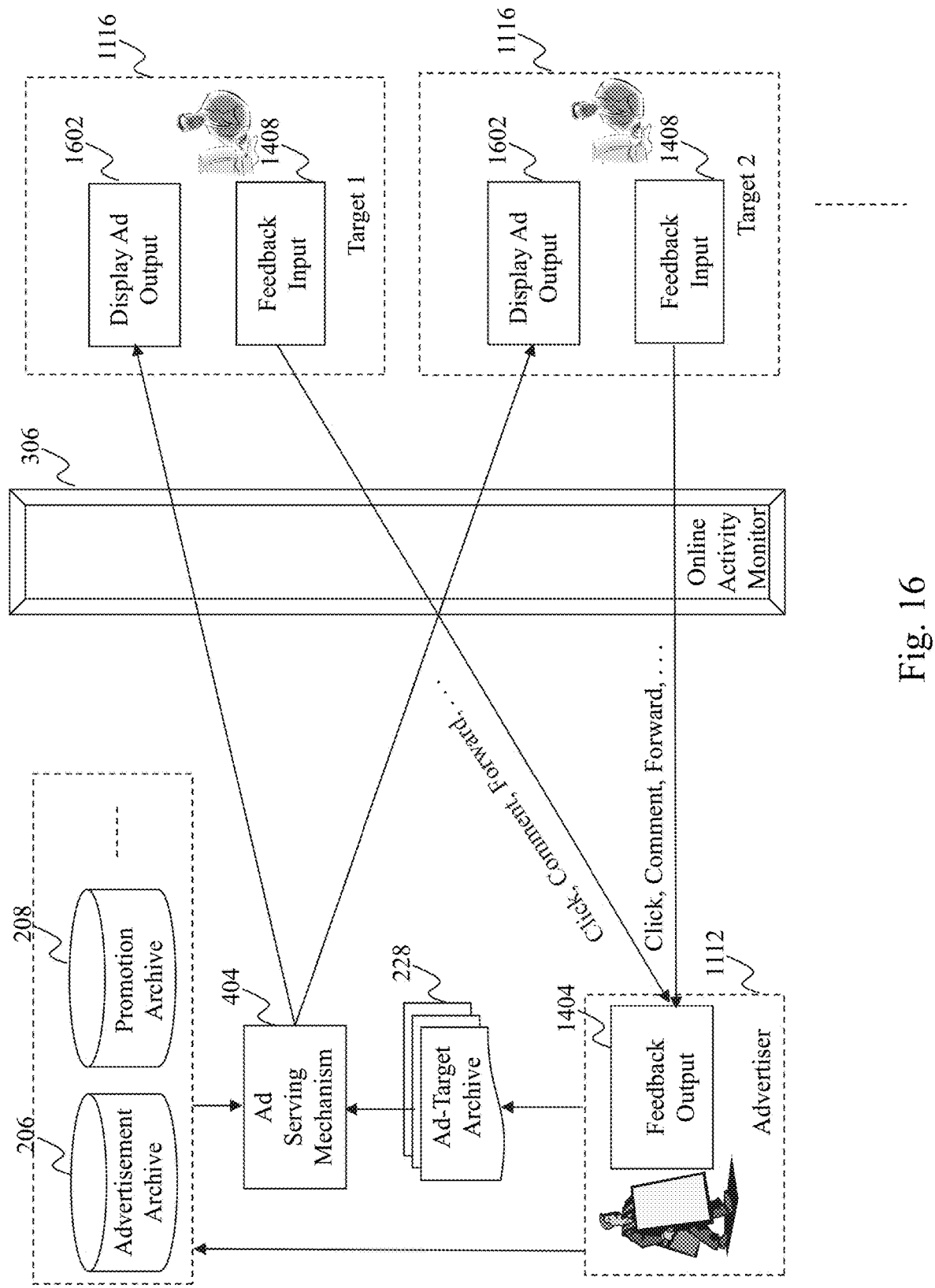
FIG. 16 depicts information exchange through bi-directional communication channels established between one entity and multiple targets, according to an embodiment of the present teaching.

FIG. 16 depicts information exchange through bi-directional communication channels established between one entity and multiple targets, according to an embodiment of the present teaching. Different from FIG. 14, display advertising, instead of social network messaging, is applied to broadcast content to the targets. In this example, the advertising serving mechanism 404 is configured to, for each advertiser account 1112, retrieve content from the advertisement archive 206 and/or promotion archive 208 and transmit the content to the target accounts 1116 identified by the index stored in the ad-target archive 228. In the social network setting, regular display advertising with dynamic meta contents being the most-recent advertising messages are presented by the display adversities output 1602 of each target account 1116.

Figure 17:
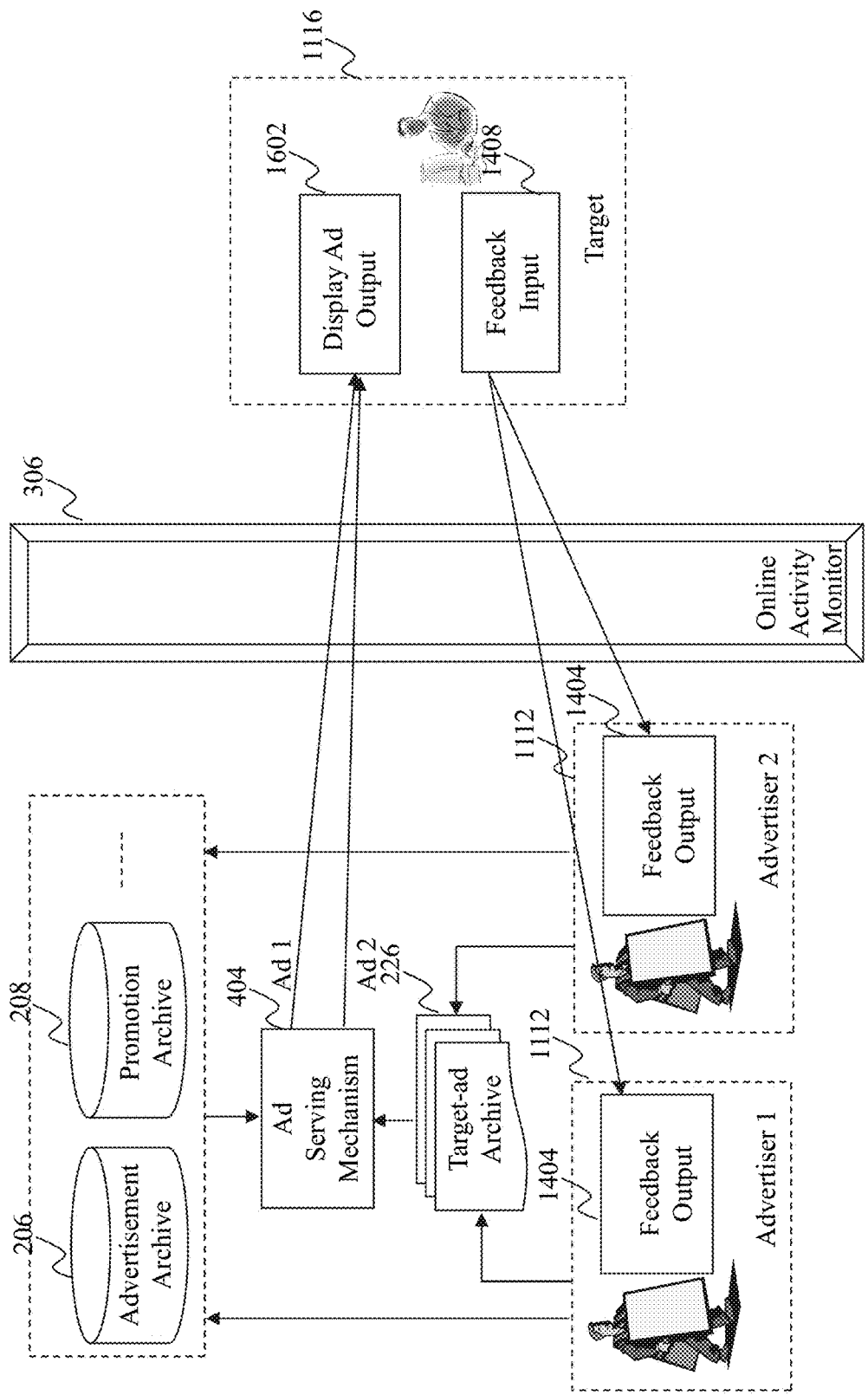
FIG. 17 depicts information exchange through bi-directional communication channels established between multiple entities and one target, according to an embodiment of the present teaching.

FIG. 17 depicts information exchange through bi-directional communication channels established between multiple entities and one target, according to an embodiment of the present teaching. In this example, a plurality of entities (advertisers) are identified for the target (user), and the bi-directional communication channels are established between the advertiser accounts 1112 and the target account 1116. Different from FIG. 16, the index stored in the target-ad archive 226, instead of the ad-target archive 228, is applied by the advertising serving mechanism 404 in order to determine, for each advertiser account 1112, the corresponding target account 1116 where the display advertising is provided.

Figure 18:
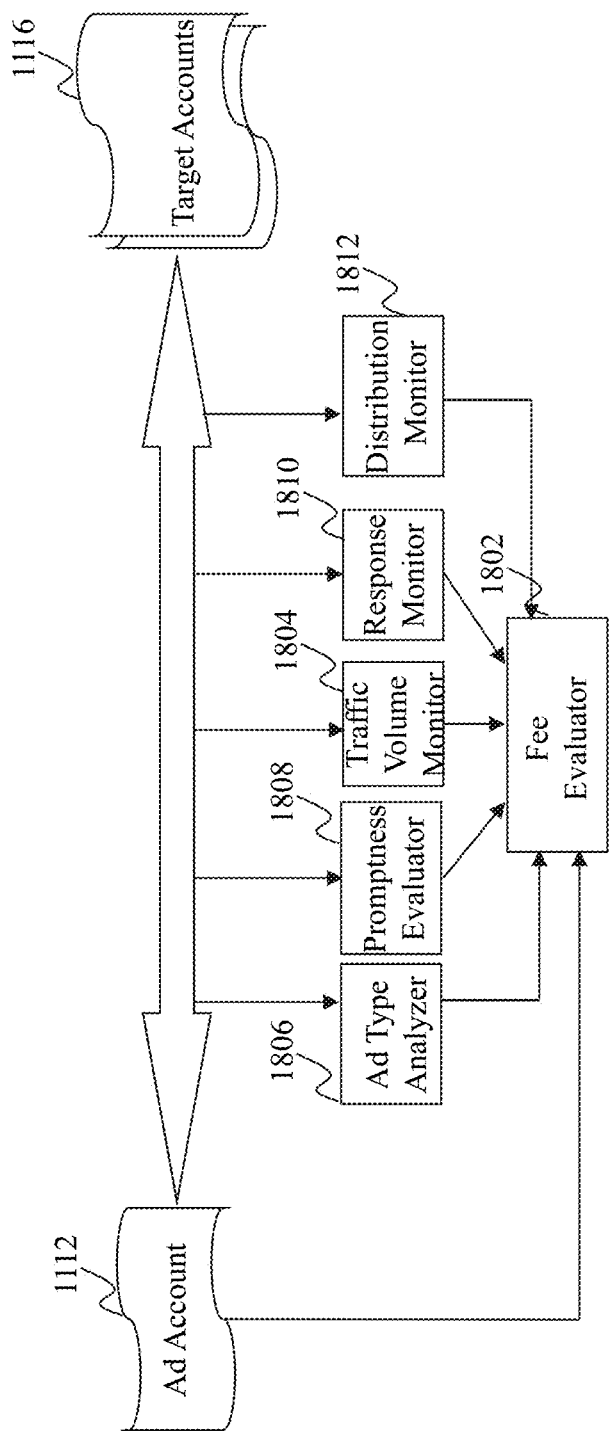
FIG. 18 is a system diagram for an exemplary online activity monitor of the system for online advertising, according to an embodiment of the present teaching.

FIG. 18 is a system diagram for an exemplary online activity monitor of the system for online advertising, according to an embodiment of the present teaching. The online activity monitor 306 may include a fee evaluator 1802 configured to calculate a monetary amount to be charged to each entity based on information related to the monitored activities between the advertiser account 1112 and target account 1116 through the bi-directional communication channel. The information may be collected by various means, including a traffic volume monitor 1804, an advertising type analyzer 1806, a promptness evaluator 1808, a response monitor 1810, and a distribution monitor 1812. In one example, the monetary amount may be determined based on multiplication of volume of content delivered from the advertiser account 1112, number of followers (target accounts 1116), and rate (cost per byte per follower at a position). The volume of content may be monitored by the traffic volume monitor 1804. The number of followers may be monitored by the distribution monitor 1812. As to the rate, it may be determined based on a display advertising auction/price bidding model at the connection initiation stage. For example, when multiple advertisers or advertisements are provided to a user, the ranking (position) of each advertiser or advertisement on the recommendation list may affect the rate.

In another example, instead of applying the auction/price bidding model to determine the rate, the rate may be fixed depending on the type of connection relationship. The permanent/premium relationship has the highest rate; the temporary/short-term relationship has the medium rate, while the implicit relationship has the lowest rate. The rate may be also determined based on the strength of the connection, which is determined by the combined score in FIGS. 7 and 9, quality/authority of the advertiser or advertisement, promptness (how timely the users receive the broadcasted content) determined by the promptness evaluator 1808, the type of content being broadcasted (e.g., text, rich media, etc.) obtained by the advertising type analyzer 1806, and the feedback on the delivered content (e.g., positive, negative, neutral) collected by the response monitor 1810. In another example, each message may contain tiny URLs, thus the advertisers may be charged with a click through rate similarly as in the cost per click model. As described before, the advertisements may be delivered in the form of display advertising instead of social network messages. In this case, the monetary amount may also depend on impressions.

It is understood that, the broadcasting may be cross platforms, meaning once the connections are established, users may receive the advertising messages of any third party social media products. For example, the user may sign into the system 300, 400 with the user's id of any third party social media products or directly sign into the third party social media products. In that case, the revenue generated by charging the advertisers may be shared with the third party social media product provider.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 19:
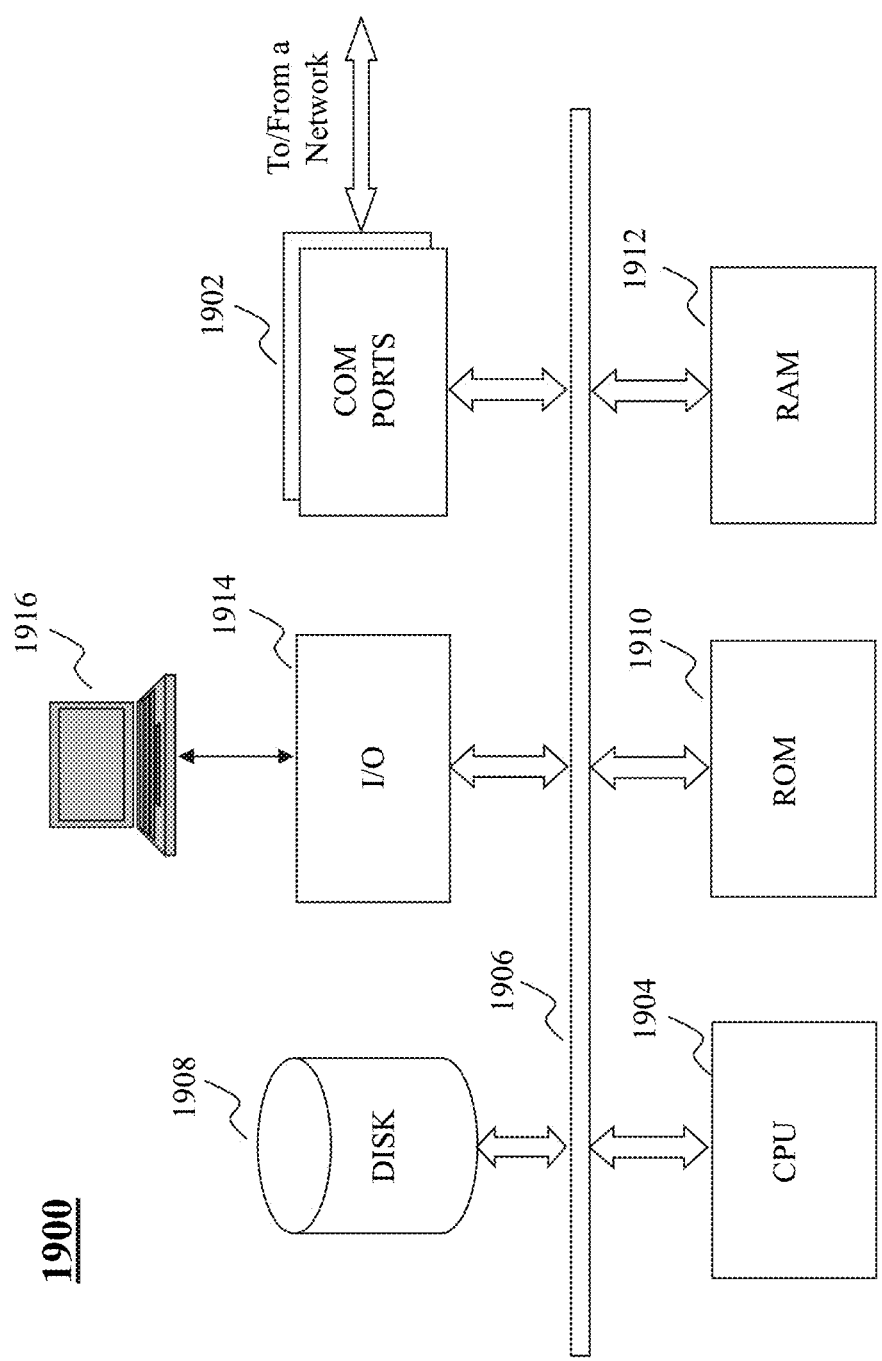
FIG. 19 depicts a general computer architecture on which the present teaching can be implemented.

FIG. 19 depicts a general computer architecture on which the present teaching can be implemented and has a functional block diagram illustration of a computer hardware platform that includes user interface elements. The computer may be a general-purpose computer or a special purpose computer. This computer 1900 can be used to implement any components of the online advertising architecture as described herein. Different components of the system 200, 300, 400 can all be implemented on one or more computers such as computer 1900, via its hardware, software program, firmware, or a combination thereof. Although only one such computer is shown, for convenience, the computer functions relating to online advertising may be implemented in a distributed fashion on a number of similar platforms, to distribute the processing load.

The computer 1900, for example, includes COM ports 1902 connected to and from a network connected thereto to facilitate data communications. The computer 1900 also includes a central processing unit (CPU) 1904, in the form of one or more processors, for executing program instructions. The exemplary computer platform includes an internal communication bus 1906, program storage and data storage of different forms, e.g., disk 1908, read only memory (ROM) 1910, or random access memory (RAM) 1912, for various data files to be processed and/or communicated by the computer, as well as possibly program instructions to be executed by the CPU 1904. The computer 1900 also includes an I/O component 1914, supporting input/output flows between the computer 1900 and other components therein such as user interface elements 1916. The computer 1900 may also receive programming and data via network communications.

Hence, aspects of the method of online advertising, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution. In addition, the components of the system as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method implemented on at least one machine, each of which has at least one processor, storage, and a communication platform connected to a network for online advertising, comprising the steps of:
    the machine identifies one or more targets associated with an entity using an ad-target identifier based on a first piece of information related to each target and a second piece of information related to the entity, wherein the one or more targets are considered as likely being interested in content that can be made available by the entity;
    the machine determines a type of recommendation relationship between the entity and each target using a connection initiator based on a response provided by the target to a query issued by the entity;
    the machine creates the type of recommendation relationship using the connection initiator with a limitation on how the type recommendation relationship is to last;
    the machine determines a type of connection to be established between the entity and each identified target through a bi-directional communication channel on a platform using the connection initiator based on the first piece of information and the second piece of information; and
    the machine monitors activities between the entity and each target through the bi-directional communication channel using an online activity monitor, wherein
    the entity delivers the content to an identified target through the bi-directional communication channel established between the entity and the identified target, the content being displayed on the webpage acceded by the target; and
    the machine in response to the delivered content makes the identified target be able to provide a feedback collected by a response monitor, to the entity through the bi-directional communication channel, wherein the feedback includes at least a type of interaction of the identified target with respect to the content delivered on the webpage, wherein the target provides the feedback to the entity in the form of a social network message.

2. The method of claim 1, wherein the first information related to each target includes at least one of:
    information reflecting profile of each target;
    information about online activities of each target;
    information about content related to each target;
    information related to a social influence level of each target; and
    information reflecting a purchasing behavior of each target.

3. The method of claim 1, wherein the second information related to the entity includes at least one of:
    information reflecting profile of the entity;
    information about each piece of content to be delivered by the entity; and
    information about an effectiveness of delivering each piece of content by the entity.

4. The method of claim 1, wherein die bi-directional communication channel is on a social network platform.

5. The method of claim 4, wherein the step of establishing a connection comprises the steps of:
    creating an account for the entity on the social network platform;
    issuing the query corresponding to recommending the account of the entity to the identified one or more targets to follow; and
    determining the recommendation relationship between the account of the entity and an account of each identified target based on the response to the recommendation to follow made by each identified target.

6. The method of claim 5, wherein the relationship includes at least one of:
    a permanent relationship when a target accepts the recommendation to follow;
    a temporary relationship when a target accepts the recommendation to follow, and when there is a time condition of terminating the connection after a period of time; and
    an implicit relationship when a target does not accept the recommendation to follow.

7. The method of claim 5, further comprising:
    transmitting the content in the form of a social network message from the account of the entity to the accounts of the identified one or more targets; and
    presenting the content in the form of a social network message to the identified one or more targets.

8. The method of claim 7, further comprising:
    receiving an input associated with a feedback based on the presented content from one of the identified targets; and
    presenting the feedback to the entity.

9. The method of claim 8, wherein the feedback includes at least one of:
    clicking on the social network message;
    commenting on the social network message;
    liking/disliking the social network message; and
    forwarding the social network message.

10. The method of claim 5, further comprising:
    transmitting the content in the form of a display advertisement fro nan advertisement archive associated with the entity to the accounts of the identified one or more targets; and
    presenting the content in the form of a display advertisement to the identified one or more targets.

11. The method of claim 1, further comprising calculating a monetary amount to be charged to the entity based on information related to the monitored activities.

12. The method of claim 11, wherein the information related to the monitored activities includes at least one of:
a type of the content to be delivered by the entity;
a promptness of the content to be delivered by the entity;
a traffic volume through the bi-directional communication channel;
the feedback in response to receiving the content; and
a distribution of the identified one or more targets.

13. The method of claim 1, further comprising providing information related to the monitored activities to the entity to facilitate the entity to determine whether to send the content to each identified target.

14. The method of claim 1, wherein the step of identifying one or more targets comprises the steps of:
fetching the first piece of information related to each target;
characterizing each target based on the first piece of information to create a plurality of target vectors;
fetching the second piece of information related to the entity;
characterizing the entity based on the second piece of information to create an entity vector; and
calculating a relevance score for each target and the entity based on their target vectors and the entity vector.

15. The method of claim 14, further comprising:
calculating an influence score and a purchasing score for each target based on their related first piece of information; and
ranking the identified one or more targets for the entity based on the relevance score, the influence score, and the purchasing score.

16. The method of claim 1, wherein the response associates the relationship with a time period after which the relationship is to be terminated.

17. The method of claim 1, further comprising:
calculating a monetary amount to be charged to the entity based on the type of connection.

18. A system for online advertising, comprising:
a processor, comprising an identifier, a connection initiator and an online activity monitor; and
a memory, connected with the processor and arranged to store at least one executable instruction of the processor,
wherein the processor is arranged to execute the at least one executable instruction, and the at least one executable instruction comprises:
identifying one or more targets associated with an entity using an ad-target identifier based, on a first piece of information related to each target and a second, piece of information related to the entity by the identifier, wherein the one or more targets are considered as likely being interested in, content that can be made available by the entity;
determining a type of recommendation relationship between the entity and each target based on a response provided by the target to a query issued by the entity, and creating the type of recommendation relationship with a limitation on how long the type of recommendation relationship is to last by the connection initiator, and
monitoring activities between the entity and each identified target through the bi directional communication channel by the online activity monitor, wherein the entity delivers the content to an identified target through the bi-directional communication channel established between the entity and the identified target, the content being displayed on the webpage acceded by the target; and
in response to the delivered content, each identified target is able to provide a feedback collected by a response monitor to the entity through the bi-directional communication channel, wherein the feedback includes at least a type of interaction of the identified target with respect to the content delivered on the webpage, and the target provides the feedback to the entity in the form of a social network message.

19. The system of claim 18, wherein the connection initiator is further configured to:
create an account for the entity on a social network platform;
issue the query corresponding to recommend the account of the entity to the identified one or more targets to follow; and
determine the recommendation relationship between the account of the entity and an account of each identified target based on the response to the recommendation to follow made by each identified target.

20. The system of claim 19, wherein the relationship includes at least one of:
a permanent relationship when a target accepts the recommendation to follow;
a temporary relationship when a target accepts the recommendation to follow, and when there is a time condition of terminating the connection after a period of time; and
an implicit relationship when a target does not accept the recommendation to follow.

21. The system of claim 19, further comprising:
a social network message broadcasting unit configured to transmit the content in the form of a social network message from the account of the entity to the accounts of the identified one or more targets; and
a social network message output configured to present the content in the form of a social network message to the identified one or more targets.

22. The system of claim 21, further comprising:
a feedback input configured to receive an input associated with a feedback based on the presented content from one of the identified targets; and
a feedback output configured to present the feedback to the entity.

23. The system of claim 15, further comprising a fee evaluator configured to calculate a monetary amount to be charged to the entity based on information related to the monitored activities.

24. The system of claim 15, wherein the identifier is further configured to:
fetch the first piece of information related to each target;
characterize each target based on the first piece of information to create a plurality of target vectors;
fetch the second piece of information related to the entity;
characterize the entity based on the second piece of information to create an entity vector; and
calculate a relevance score for each target and the entity based on their target vectors and the entity vector.

25. The system of claim 24, wherein the identifier is further configured to:
calculate an influence score and a purchasing score for each target based on their related first piece of information; and rank the identified one or more targets for the entity based on the relevance score, the influence score, and the purchasing score.

26. A machine-readable tangible and non-transitory medium having information for online advertising recorded thereon, on which at least one computer, program is stored, the at least one computer program being executed by a processor to implement the following steps:

identifying one or more targets associated with an entity using an ad-target identifier based on a first piece of information related to each target and a second piece of information related to the entity, wherein the one or more targets are considered as likely being interested in content that can be made available by the entity;

determining a type of recommendation relationship between the entity and each target using a connection initiator based on a response provided by the target to a query issued by the entity;

creating the type of recommendation relationship using the connection initiator with a limitation on how long the type of recommendation relationship is to last;

determining a type of connection to be established between the entity and each identified target through a bi-directional communication channel on a platform using the connection initiator based on the first piece of information and the second piece of information; and monitoring activities between the entity and each target through the bi-directional communication channel using an online activity monitor, wherein the entity delivers the content to an identified target through the bi-directional communication channel established between the entity and the identified target, the content being displayed on the webpage accessed by the target; and in response to the delivered content, the identified target is able to provide a feedback collected by a response monitor to the entity through the bi-directional communication channel, wherein the feedback includes at least a type of interaction of the identified target with respect to the content delivered on the webpage, and the target provides the feedback to the entity in the form of a social network message.

27. The medium of claim 26, wherein the bi-directional communication channel is on asocial network platform.

28. The medium of claim 27, wherein the step of establishing a connection comprises the steps of:

creating an account for the entity on the social network platform;

issuing the query corresponding to recommending the account of the entity to the identified one or more targets to follow; and determining the recommendation relationship between the account of the entity and an account of each identified target based on the response to the recommendation to follow made by each identified target.

29. The medium of claim 28, wherein the relationship includes at least one of:

a permanent relationship when a target accepts the recommendation to follow;

a temporary relationship when a target accepts the recommendation to follow, and when there is a time condition of terminating the connection after a period of time; and an implicit relationship when a target does not accept the recommendation to follow.

30. The medium of claim 28, further comprising transmitting the content in the form of a social network message from the account of the entity to the accounts of the identified one or more targets; and presenting the content in the form of a social network message to the identified one or more targets.

31. The medium of claim 30, further comprising receiving an input associated with a feedback based on the presented content from one of the identified targets; and transmitting the feedback to the entity.

32. The medium of claim 26, further comprising calculating a monetary amount to be charged to the entity based on information associated with the monitored activities.

33. The medium of claim 26, wherein the step of identifying one or more targets comprises the steps of:

fetching the first piece of information related to each target;

characterizing each target based on the first piece of information to create a plurality of target vectors;

fetching the second piece of information related to the entity;

characterizing the entity based on the second piece of information to create an entity vector; and calculating a relevance score for each target and the entity based on their target vectors and the entity vector.

34. The medium of claim 33, further comprising:

calculating an influence score and a purchasing score for each target based on their related first piece of information; and ranking the identified one or more targets for the entity based on the relevance score, the influence score, and the purchasing score.

35. A method implemented on at least one machine, each of which has at least one processor, storage, and a communication platform connected to a network for online advertising, comprising the steps of:

the machine obtains a first piece of information related to a user;

the machine identifies, with respect to the user, one or more entities using an ad-target identifier based on the first piece of information related to the user and a second piece of information related to each entity, where each identified entity is capable of providing content, wherein the one or more identified entities are considered as likely having content that is of interest of the user;

the machine determines a type of recommendation relationship between the user and each entity using a connection initiator based on a response provided by the user to a query issued by the entity;

the machine creates the type of recommendation relationship using the connection initiator with a limitation on how long the type of recommendation relationship is to last;

the machine determines a type of connection to be established between the user and each identified entity through a bi-directional communication channel on a platform using the connection initiator based on the first piece of information and the second piece of information;

the machine identifies one or more pieces of content that can be made available by each identified entity based on the first piece of information related to the user and the second piece of information related to each identified entity; and the machine facilitates the delivery of the identified one or more pieces of content from each identified entity through the bi-directional communication channel established between each identified entity and the user, wherein the identified entity delivers the identified one or more pieces of content to the user through the bi-directional communication channel therebetween, wherein the one or more pieces of content is displayed on a webpage accessed by the user; and in response to the delivered one or more pieces of content, the user is able to provide a feedback collected by a response monitor to the identified entity through the bi-directional communication channel there between, wherein the feedback includes at least a type of interaction of the user with respect to the content delivered on the webpage, and the target provides the feedback to the entity in the form of a social network message.

36. The method of claim 35, wherein the first information related to the user includes at least one of information reflecting profile of the user;

information about online activities of the user; and
information about content related to the user.

37. The method of claim 35, wherein the second information related to each entity includes at least one of:

information reflecting profile of each entity;
information about each piece of content that can be made available by each entity; and information about an effectiveness of delivering each piece of content by each entity.

38. The method of claim 35, wherein the step of identifying one or more entities comprises the steps of:

characterizing the user based on the first piece of information to create a user vector;
fetching the second piece of information related to each entity;
characterizing each entity based on the second piece of information to create a plurality of entity vectors; and
calculating a relevance score for the user and each entity based on their entity vectors and the user vector.

39. The method of claim 38, wherein the step of identifying one or more pieces of content comprises the steps of:

characterizing each piece of content that can be made available by each identified entity based on the second piece of information to create a plurality of content vectors; and
calculating a relevance score for the user and each piece of content based on their content vectors and the user vector.

40. The method of claim 39, further comprising:

calculating an effectiveness score for each piece of content based on the second piece of information; and
ranking the pieces of content based on the relevance score and the effectiveness score.

\* \* \* \* \*